(12) United States Patent
Kim

(10) Patent No.: US 12,531,132 B2
(45) Date of Patent: Jan. 20, 2026

(54) SEMICONDUCTOR DEVICES RELATED TO GENERATION OF INTERNAL COMMANDS

(71) Applicant: SK hynix Inc., Icheon-si (KR)

(72) Inventor: Hyun Seung Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 135 days.

(21) Appl. No.: 18/581,160

(22) Filed: Feb. 19, 2024

(65) Prior Publication Data

US 2025/0124999 A1   Apr. 17, 2025

(30) Foreign Application Priority Data

Oct. 17, 2023   (KR) .................... 10-2023-0139063

(51) Int. Cl.
*G11C 29/46*   (2006.01)
*G11C 29/12*   (2006.01)
*G11C 29/14*   (2006.01)

(52) U.S. Cl.
CPC ........ *G11C 29/46* (2013.01); *G11C 29/12015* (2013.01); *G11C 29/14* (2013.01)

(58) Field of Classification Search
CPC .... G11C 29/46; G11C 29/12015; G11C 29/14
See application file for complete search history.

(56) References Cited

U.S. PATENT DOCUMENTS

| | | |
|---|---|---|
| 2013/0250701 A1 | 9/2013 | Bringivijayaraghavan et al. |
| 2017/0154670 A1* | 6/2017 | Kim ....................... G11C 11/408 |

FOREIGN PATENT DOCUMENTS

KR   1020210070138 A   6/2021

* cited by examiner

*Primary Examiner* — Han Yang
(74) *Attorney, Agent, or Firm* — WILLIAM PARK AND ASSOCIATES LTD.

(57) ABSTRACT

A semiconductor device includes a skip exit control circuit configured to select one of a plurality of skip signals as a selection skip signal, responsive to a test mode signal, and generate a skip exit signal, responsive to the selection skip signal, a mode control circuit configured to generate a mode signal to change the mode responsive to the skip exit signal until entering a preset final mode, and a command control circuit configured to generate internal commands for each mode, responsive to the mode signal.

34 Claims, 33 Drawing Sheets

SEMICONDUCTOR DEVICES RELATED TO GENERATION OF INTERNAL COMMANDS

CROSS-REFERENCE TO RELATED APPLICATIONS

The present application claims priority under 35 U.S.C. 119 (a) to Korean Patent Application No. 10-2023-0139063, filed on Oct. 17, 2023, in the Korean Intellectual Property Office, which is incorporated herein by reference in its entirety.

BACKGROUND

1. Technical Field

The present disclosure relates to semiconductor devices related to the generation of internal commands.

2. Related Art

In general, a semiconductor device receives external commands through an external device such as a controller and performs internal operations such as an active operation, a read operation, and a write operation. To perform a test to check whether the internal operations performed in the semiconductor device are performed properly, the semiconductor device may receive external commands from a test device.

When there is a difference in the operating speed of the semiconductor devices and the test devices, the semiconductor devices may not receive the external commands from the test devices and may need to generate internal commands for testing themselves.

SUMMARY

In accordance with an embodiment of the present disclosure, a semiconductor device may include a skip exit control circuit configured to set one of a plurality of skip signals as a selection skip signal, responsive to a test mode signal, and generate a skip exit signal, responsive to the selection skip signal, a mode control circuit configured to generate a mode signal to change the mode responsive to the skip exit signal until entering a preset final mode, and a command control circuit configured to generate internal commands for each mode, responsive to the mode signal.

In accordance with an embodiment of the present disclosure, a semiconductor device may include a skip control circuit configured to generate a command pulse and a plurality of skip signals, responsive to a skip exit signal, a mode control circuit configured to generate a mode signal to change a mode, responsive to the skip exit signal until entering a preset final mode, and a command control circuit configured to generate internal commands for each mode, responsive to the command pulse and the mode signal. In the present disclosure, the skip exit signal may be generated responsive to a selection skip signal, and the selection skip signal may be set as one of the plurality of skip signals, responsive to a test mode signal.

In accordance with an embodiment of the present disclosure, a semiconductor device may include a skip exit control circuit configured to select one of a plurality of skip signals as a first selection skip signal, responsive to a first test mode signal in a first mode, and generate a skip exit signal that is activated to enter a second mode from the first selection skip signal in synchronization with a clock, a mode control circuit configured to generate the first mode signal to enter the first mode when the skip exit signal is activated in an initial mode, and generate the second mode signal to enter the second mode when the skip exit signal is activated in the first mode, and a command control circuit configured to generate a first internal command in the first mode, responsive to the first mode signal, and generate a second internal command in the second mode, responsive to the second mode signal.

DETAILED DESCRIPTION

Figure 1:
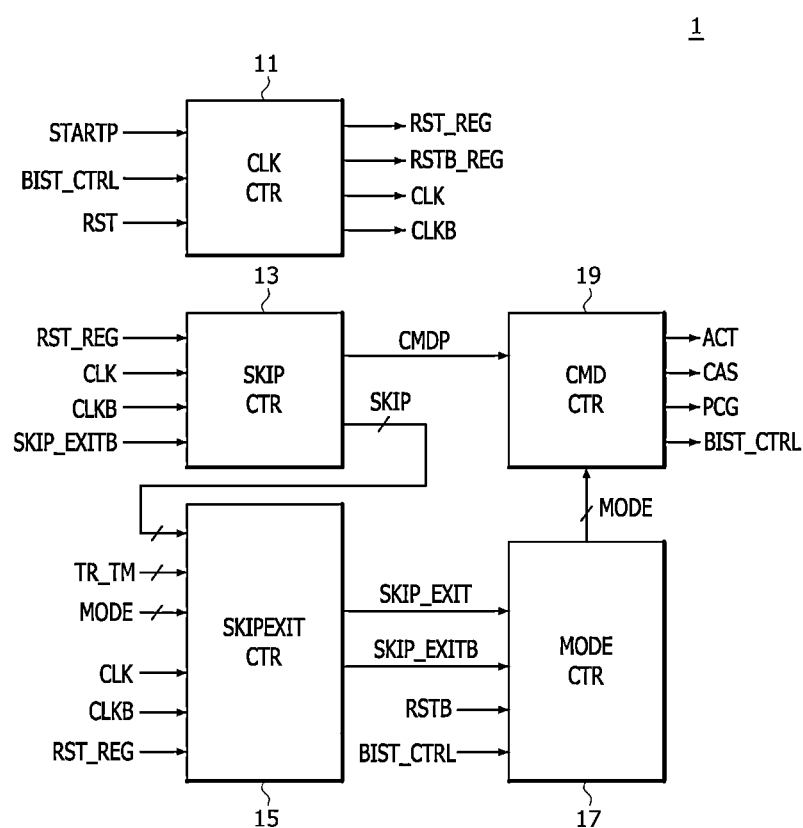
FIG. 1 is a block diagram illustrating a configuration of a semiconductor device according to an embodiment of the present disclosure.

In the following description of embodiments, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm being executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage corresponds to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

The word "set" can be used as a noun as well as a verb. The Merriam-Webster's Collegiate Dictionary provides several definitions for the noun form of "set." It also provides several definitions for the verb form of "set." For this disclosure the noun form of "set" refers to "a number of things of the same kind that belong or which are used together." For example, a set of eight binary digits comprise a binary word.

As for the verb form of "set," as used herein, the verb form of "set" means to cause to assume a specific value. For example, when a binary digit is set, its value is made equal to either logic one or logic zero. As used herein, the context in which "set" is used will determine whether "set" is used as a noun or a verb.

The term "logic bit set" may mean a combination of logic levels of bits included in a signal. When the logic level of each of the bits included in the signal is changed, the logic bit set of the signal may be set differently. For example, when the signal includes two bits, when the logic level of each of the two bits included in the signal is "logic low level, logic low level", the logic bit set of the signal may be set, i.e., binary value or values will be specified, as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

FIG. 1 is a block diagram illustrating a configuration of a semiconductor device 1 according to an embodiment of the present disclosure. As shown in FIG. 1, the semiconductor device 1 may include a clock control circuit (CLK CTR) 11, a skip control circuit (SKIP CTR) 13, a skip exit control circuit (SKIPEXIT CTR) 15, a mode control circuit (MODE CTR) 17, and a command control circuit (CMD CTR) 19.

The clock control circuit 11 may generate a reset regulating signal RST_REG, an inverted reset regulating signal RST_REGB, a clock CLK, and an inverted clock CLKB, responsive to a start pulse STARTP input signal, an end command BIST_CTRL input signal, and a reset signal RST input signal. The clock control circuit 11 may generate the reset regulating signal RST_REG and the inverted reset regulating signal RST_REGB when at least one of the start pulse STARTP, the end command BIST_CTRL, and the rest signal RST is activated. The start pulse STARTP may be activated to start a test mode for generating internal commands such as, an active command ACT, a column access (CAS) command CAS, a precharge command PCG, and the end command BIST_CTRL. The end command BIST_CTRL may be activated to terminate the test mode for generating the internal commands ACT, CAS, PCG, and BIST_CTRL. The reset signal RST may be activated for an initialization operation of the semiconductor device 1. The clock control circuit 11 may generate the clock CLK and an inverted clock CLKB that toggle when the start pulse STARTP is activated to start the test mode. The clock control circuit 11 may generate the clock CLK and the inverted clock CLKB whose logic levels are fixed when the end command BIST_CTRL is activated to terminate the test mode or the reset signal RST is activated for the initialization operation.

Figure 7:
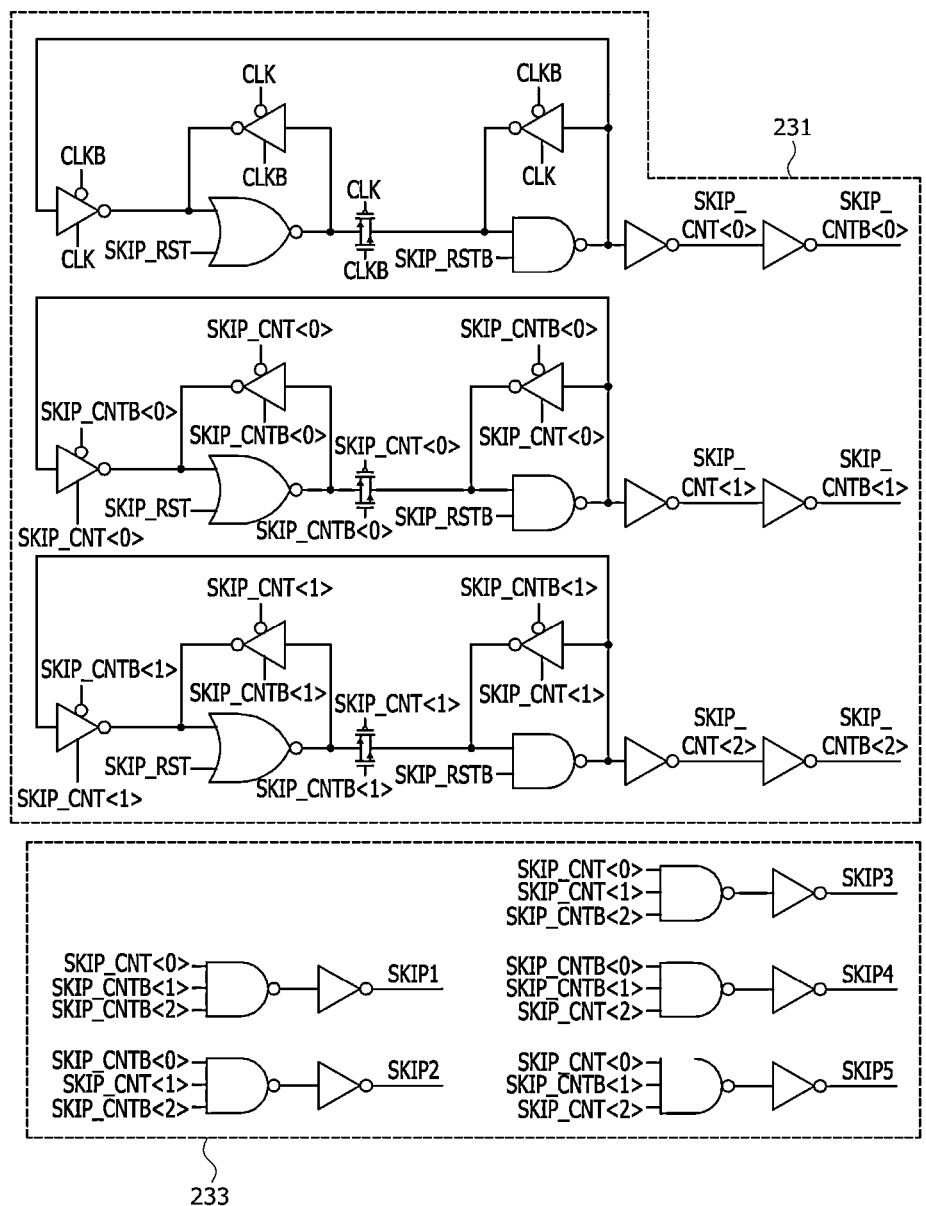
FIG. 7 is a circuit diagram according to an embodiment of a skip signal generation circuit included in the skip control circuit shown in FIG. 5.

The skip control circuit 13 may generate a command pulse CMDP that is activated in synchronization with the clock CLK when the inverted skip exit signal SKIP_EXITB is activated. The skip control circuit 13 may generate at least one skip signal SKIP including bits that are sequentially activated, e.g., set to logic one, after an inverted skip exit signal SKIP_EXITB is activated. As explained below, the skip signal SKIP may include a first skip signal SKIP1, a second skip signal SKIP2, a third skip signal SKIP3, a fourth skip signal SKIP4, and a fifth skip signal SKIP5, (as shown in FIG. 7) but this is only an example and the present disclosure is not limited thereto.

The skip exit control circuit 15 may generate skip setting signals (e.g., TRCD, TCCD, TWR, and TRP of FIG. 8), responsive to the skip signal SKIP and at least one test mode signal TR_TM. In the present embodiment, the test mode signal TR_TM may include a first test mode signal TRCD_TM<0:2>, a second test mode signal TCCD_TM<0:2>, a third test mode signal TWR_TM<0:2>, and a fourth test mode signal TRP_TM<0:2>, but this is only an example and the present disclosure is not limited thereto. The skip exit control circuit 15 may generate mode setting signals (e.g., ASYNC1 and ASYNC2 of FIG. 8) as intermediate signals to generate the inverted skip exit signal SKIP_EXITB, responsive to the mode signal MODE and the skip setting signals (e.g., TRCD, TCCD, TW R, and TRP of FIG. 8). The skip exit control circuit 15 may generate a skip exit signal SKIP_EXIT and an inverted skip exit signal, SKIP_EXITB, which are activated in synchronization with the clock CLK after the mode setting signals (e.g., ASYNC1 and ASYNC2 in FIG. 8) are activated for each mode. In exemplary embodiment, the mode may include a plurality of operation modes, such as, at least one test mode and at least one active mode, etc. In exemplary embodiment, the mode may include a test mode and an active mode which include an initial mode and a first to nth modes.

The mode control circuit 17 may generate the mode signal MODE that is initialized when one of the inverted reset signal RSTB and the end command BIST_CTRL is activated. The mode control circuit 17 may generate the mode signal MODE to change the mode whenever at least one of the skip exit signal SKIP_EXIT and the inverted skip exit signal SKIP_EXITB are activated until the preset final mode is entered. For example, the skip exit signal SKIP_EXIT and the inverted skip exit signal SKIP_EXITB may be activated at different logic level. The mode control circuit 17 may generate the mode signal MODE to maintain the mode when the skip exit signal SKIP_EXIT and the inverted skip exit signal SKIP_EXITB are activated after the preset final mode is entered.

The command control circuit 19 may generate the active command ACT, the CAS command CAS, the precharge command PCG, and the end command BIST_CTRL, responsive to the command pulse CMDP and the mode signal MODE. The command control circuit 19 may generate the active command ACT that is activated when entering the first mode responsive to the mode signal MODE in a state in which the command pulse CMDP is activated. The command control circuit 19 may generate the CAS command that is activated when entering the second mode responsive to the mode signal MODE while the command pulse CMDP is activated. The command control circuit 19 may generate the precharge command PCG that is activated when entering the fourth mode responsive to the mode signal MODE while the command pulse CMDP is activated. The command control circuit 19 may generate the end command BIST_CTRL that is activated when a preset end delay section has elapsed after an end pulse ENDP is activated, when entering the fifth mode responsive to the mode signal MODE while the command pulse CMDP activated.

Figure 2:
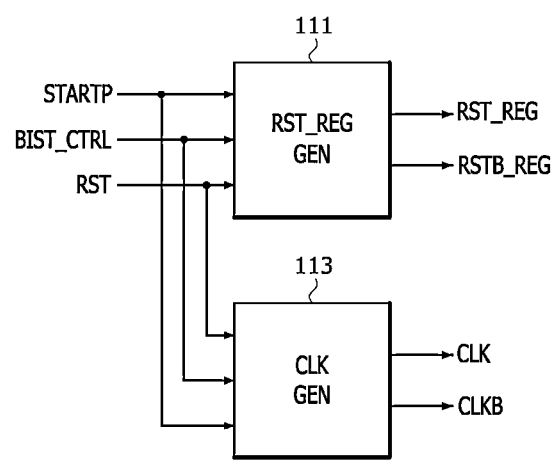
FIG. 2 is a block diagram illustrating a configuration according to an embodiment of a clock control circuit included in the semiconductor device shown in FIG. 1.

FIG. 2 is a block diagram illustrating a configuration of a clock control circuit 11A according to an embodiment of the clock control circuit 11 shown in FIG. 1. As shown in FIG. 2, the clock control circuit 11A may include a reset regulating signal generation circuit (RST_REG GEN) 111 and a clock generation circuit (CLK GEN) 113.

The reset regulating signal generation circuit 111 may generate the reset regulating signal RST_REG and the inverted reset regulating signal RST_REGB, responsive to the start pulse STARTP, the end command BIST_CTRL, and the reset signal RST. The reset regulating signal generation circuit 111 may generate the reset regulating signal RST_REG and the inverted reset regulating signal RST_REGB that are activated when at least one of the start pulse STARTP, the end command BIST_CTRL, and the reset signal RST is activated. The reset signal RST may be activated for the initialization operation of the semiconductor device (1 of FIG. 1). The start pulse STARTP, the end command BIST_CTRL, the reset signal RST, and the reset regulating signal RST_REG may be set to be activated at a logic "high" level, and the inverted reset adjustment signal RST_REGB may be set to be activated at a logic "low" level. However, this is only an example, and the present disclosure is not limited thereto.

The clock generation circuit 113 may generate the clock CLK and the inverted clock CLKB, responsive to the start pulse STARTP, the end command BIST_CTRL, and the reset signal RST. The clock generation circuit 113 may generate the clock CLK and the inverted clock CLKB that toggle when the start pulse STARTP is activated to start the test mode. The clock generation circuit 113 may generate the clock CLK and the inverted clock CLKB whose logic levels are fixed when the end command BIST_CTRL is activated to terminate the test mode. The clock generation circuit 113 may generate the clock CLK and the inverted clock CLKB whose logic levels are fixed when the reset signal RST is activated to the initialization operation.

Figure 3:
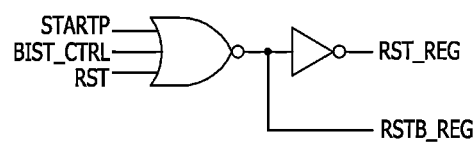
FIG. 3 is a circuit diagram according to an embodiment of a reset adjustment signal generation circuit shown in FIG. 2.

FIG. 3 is a circuit diagram of a reset regulating signal generation circuit 111A according to an embodiment of the reset regulating signal generation circuit 111 shown in FIG. 2.

As shown in FIG. 3, the reset regulating signal generation circuit 111A may generate the inverted reset regulating signal RST_REGB that is activated at a logic "low" level when at least one of the start pulse STARTP, the end command BIST_CTRL, and the reset signal RST is activated at a logic "high" level. In addition, the reset regulating signal generation circuit 111A may generate the reset regulating signal RST_REG that is activated at a logic "high" level when at least one of the start pulse STARTP, the end command BIST_CTRL, and the reset signal RST is activated at a logic "high" level. For example, the reset regulating signal generation circuit 111A may include OR gate.

Figure 4:
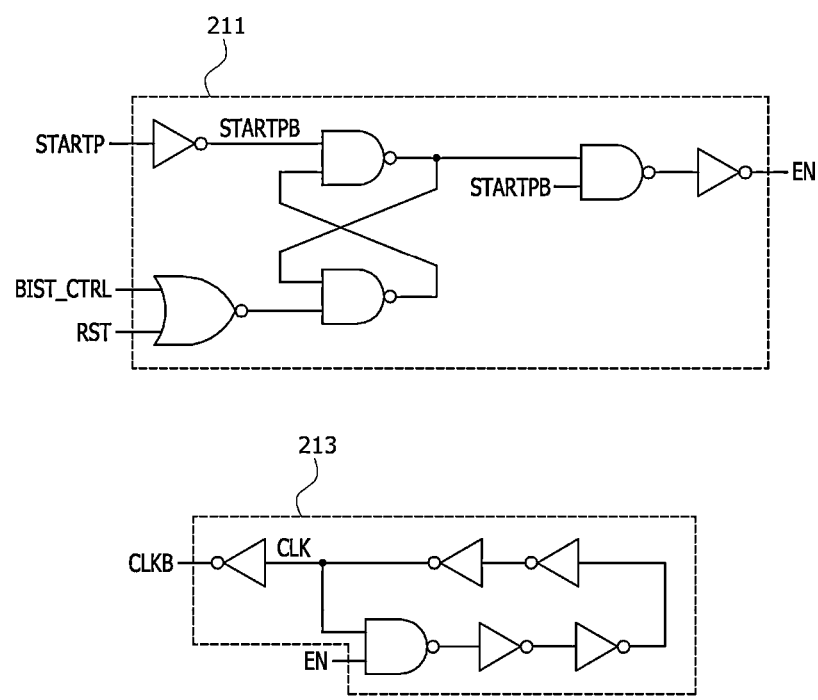
FIG. 4 is a circuit diagram according to an embodiment of a clock generation circuit shown in FIG. 2.

FIG. 4 is a circuit diagram of a clock generation circuit 113A according to an embodiment of the clock generation circuit 113 shown in FIG. 2. As shown in FIG. 4, the clock generation circuit 113A may include a clock section signal generation circuit 211 and an oscillator 213.

The clock section signal generation circuit 211 may generate a clock section signal EN, responsive to the start pulse STARTP. The clock section signal generation circuit 211 may generate an inverted start pulse STARTPB that is set to have a logic "low" level when the start pulse STARTP is activated at a logic "high" level. The clock section signal generation circuit 211 may generate the clock section signal EN that is activated at a logic "high" level according to the inverted start pulse STARTPB that is set to have a logic "high" level when the start pulse STARTP transitions from a logic "high" level to a logic "low" level. The oscillator 213 may be connected to the clock section signal generation circuit 211 to receive the clock section signal EN from the clock section signal generation circuit 211. The oscillator 213 may be connected to the clock section signal generation circuit 211, and may generate the clock CLK and the inverted clock CLKB, responsive to the clock section signal EN. The clock generation circuit 113 may generate the clock CLK and the inverted clock CLKB that toggle when the clock section signal EN is activated at a logic "high" level.

Figure 5:
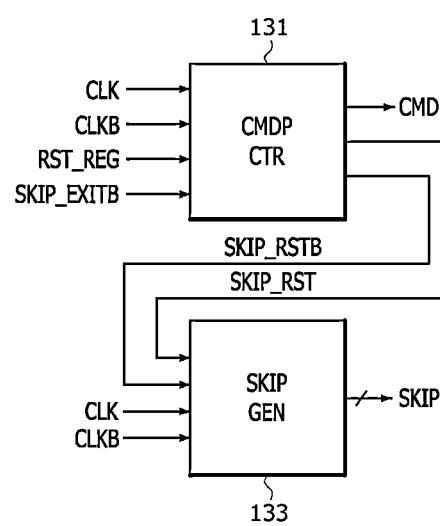
FIG. 5 is a block diagram illustrating a configuration according to an embodiment of a skip control circuit included in the semiconductor device shown in FIG. 1.

FIG. 5 is a block diagram illustrating a configuration of a skip control circuit 13A according to an embodiment of the skip control circuit 13 shown in FIG. 1. As shown in FIG. 5, the skip control circuit 13A may include a command pulse control circuit (CMDP CTR) 131 and a skip signal generation circuit (SKIP GEN) 133.

The command pulse control circuit 131 may generate the command pulse CMDP, the skip reset signal SKIP_RST, and an inverted skip reset signal SKIP_RSTB, responsive to the clock CLK, the inverted clock CLKB, the reset regulating signal RST_REG, and an inverted skip exit signal SKIP_EXITB. The command pulse control circuit 131 may generate the skip reset signal SKIP_RST and the inverted skip reset signal SKIP_RSTB that are activated when at least one of the start pulse STARTP, the end command BIST_CTRL, and the reset signal RST is activated and the reset regulating signal RST_REG is activated. The command pulse control circuit 131 may generate the skip reset signal SKIP_RST and the inverted skip reset signal SKIP_RSTB that are activated when the inverted skip exit signal SKIP_EXITB is activated. The command pulse control circuit 131 may generate the command pulse CMDP that is activated in synchronization with the clock CLK after the inverted skip reset signal SKIP_RSTB is activated.

The skip signal generation circuit 133 may be connected to the command pulse control circuit 131 to receive the skip reset signal SKIP_RST and the inverted skip reset signal SKIP_RSTB from the command pulse control circuit 131. The skip signal generation circuit 133 may generate the skip signal SKIP, responsive to the clock CLK, the inverted clock CLKB, the skip reset signal SKIP_RST, and the inverted skip reset signal SKIP_RSTB. The skip signal generation circuit 133 may initialize a skip count signal SKIP_CNT<0:2> and an inverted skip count signal SKIP_CNTB<0:2> when at least one of the skip reset signal SKIP_RST and the inverted skip reset signal SKIP_RSTB is activated. For example, the skip reset signal SKIP_RST and the inverted skip reset signal SKIP_RSTB may be activated at different logic levels. The skip signal generation circuit 133 may generate the skip signal SKIP including bits that are sequentially activated in synchronization with the clock CLK when at least one of the skip reset signal SKIP_RST and the inverted skip reset signal SKIP_RSTB is deactivated.

Figure 6:
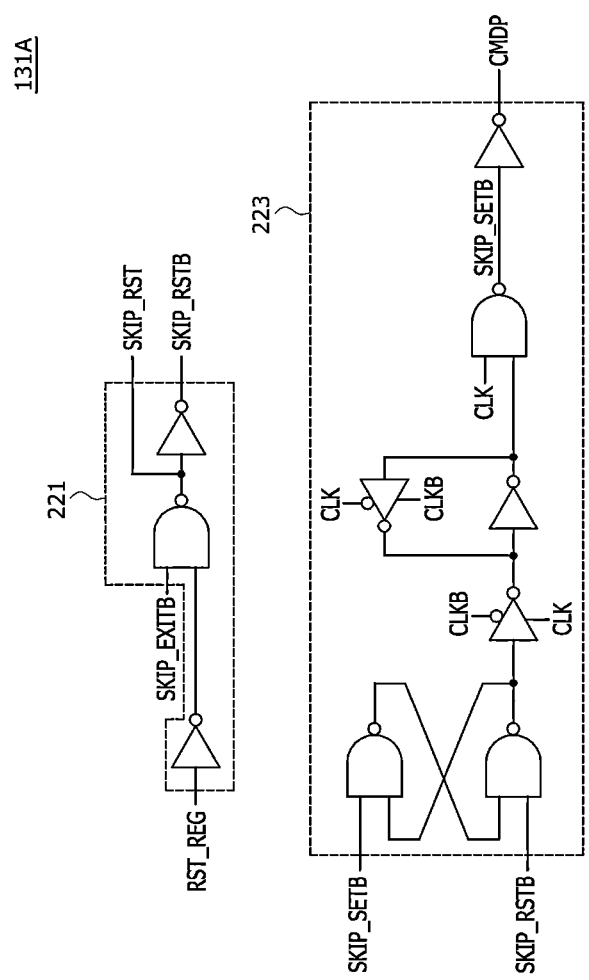
FIG. 6 is a circuit diagram according to an embodiment of a command pulse control circuit included in the skip control circuit shown in FIG. 5.

FIG. 6 is a circuit diagram of a command pulse control circuit 131A according to an embodiment of the command pulse control circuit 131 shown in FIG. 5. As shown in FIG. 6, the command pulse control circuit 131A may include a skip initialization signal generation circuit 221 and a command pulse generation circuit 223.

The skip initialization signal generation circuit 221 may generate the skip reset signal SKIP_RST and the inverted skip reset signal SKIP_RSTB, responsive to the reset regulating signal RST_REG and the inverted skip exit signal SKIP_EXITB. The skip initialization signal generation circuit 221 may generate the skip reset signal SKIP_RST that is activated at a logic "high" level and the inverted skip reset signal SKIP_RSTB that is activated at a logic "low" level when at least one of the start pulse STARTP, the end command BIST_CTL, and the reset signal RST is activated and the reset regulating signal RST_REG is activated at a logic "high" level. The skip initialization signal generation circuit 221 may generate the skip reset signal SKIP_RST that is activated at a logic "high" level and the inverted skip reset signal SKIP_RSTB that is activated at a logic "low" level when the inverted skip exit signal SKIP_EXITB is activated at a logic "low" level.

The command pulse generation circuit 223 may be connected to the skip initialization signal generation circuit 221 to receive the inverted skip reset signal SKIP_RSTB from the skip initialization signal generation circuit 221. The command pulse generation circuit 223 may generate the inverted skip set signal SKIP_SETB that is activated at a logic "low" level and the command pulse CMDP that is activated at a logic "high" level at a time point when the clock CLK transitions from a logic "low" level to a logic "high" level (hereinafter, referred to as 'rising edge') after the inverted skip reset signal SKIP_RSTB is activated at a logic "low" level.

FIG. 7 is a circuit diagram of a skip signal generation circuit 133A according to an embodiment of the skip signal generation circuit 133 shown in FIG. 5. As shown in FIG. 7, the skip signal generation circuit 133A may include a skip counter 231 and a skip decoder 233.

The skip counter 231 may generate a skip count signal SKIP_CNT<0:2> and an inverted skip count signal SKIP_CNTB<0:2>, responsive to the clock CLK, the inverted clock CLKB, the skip reset signal SKIP_RST, and the inverted skip reset signal SKIP_RSTB. The skip counter 231 may generate the skip count signal SKIP_CNT<0:2> that is initialized at a logic "low" level and the inverted skip count signal SKIP_CNTB<0:2> that is initialized at a logic "high" level when the skip reset signal SKIP_RST that is activated at a logic "high" level and the inverted skip reset signal SKIP_RSTB that is activated at a logic "low" level are received. The skip counter 231 may count the falling edges of the clock CLK that toggles when the skip reset signal SKIP_RST that is deactivated at a logic "low" level and the inverted skip reset signal SKIP_RSTB that is deactivated at a logic "high" level are received to generate the skip count signal SKIP_CNT<0:2> and the inverted skip count signal SKIP_CNTB<0:2> whose the logic bit sets are changed sequentially. As an example, the skip counter 231 may generate the skip count signal SKIP_CNT<0:2> that is set to have a first logic bit set in synchronization with a first falling edge of the clock CLK, and generate the skip count signal SKIP_CNT<0:2> that is set to have a second logic bit set in synchronization with a second falling edge of the clock CLK.

The skip decoder 233 may be connected to the skip counter 231 to receive the skip count signal SKIP_CNT<0:2> and the inverted skip count signal SKIP_CNTB<0:2> from the skip counter 231. The skip decoder 233 may decode the skip count signal SKIP_CNT<0:2> and the inverted skip count signal SKIP_CNTB<0:2> to generate the first skip signal SKIP1, the second skip signal SKIP2, the third skip signal SKIP3, the fourth skip signal SKIP4, and the fifth skip signal SKIP5. The skip decoder 233 may generate the first skip signal SKIP1 that is activated at a logic "high" level when the skip count signal SKIP_CNT<0:2> set to have a first logic bit set is received in synchronization with the first falling edge of the clock CLK. The case in which the skip count signal SKIP_CNT<0:2> is set to have the first logic bit set may mean a case in which the first bit SKIP_CNT<0> of the skip count signal SKIP_CNT<0:2> is set to have a logic "high" level, and the second and third bits SKIP_CNT<1:2> of the skip count signal SKIP_CNT<0:2> are both set to have a logic "low" level, but the present disclosure is not limited thereto. The skip decoder 233 may generate the second skip signal SKIP2 that is activated at a logic "high" level when the skip count signal SKIP_CNT<0:2> set to have a second logic bit set is received in synchronization with the second falling edge of the clock CLK. The case in which the skip count signal SKIP_CNT<0:2> is set to have the second logic bit set may mean a case in which the second bit SKIP_CNT<1> of the skip count signal SKIP_CNT<0:2> is set to have a logic "high" level and both the first bit SKIP_CNT<0> of the skip count signal SKIP_CNT<0:2> and the third bit SKIP_CNT<2> of the skip count signal SKIP_CNT<0:2> are set to have a logic "low" level, but the present disclosure is not limited thereto. The skip decoder 233 may generate the third skip signal SKIP3 that is activated at a logic "high" level when the skip count signal SKIP_CNT<0:2> set to have a third logic bit set is received in synchronization with the third falling edge of the clock CLK. The case in which the skip count signal SKIP_CNT<0:2> is set to have the third logic bit set may mean a case in which both the first and second bits SKIP_CNT<0:1> of the skip count signal SKIP_CNT<0:2> are set to have a logic "high" level and the third bit SKIP_CNT<2> of the skip count signal is set to have a logic "low" level, but the present disclosure is not limited thereto. The skip decoder 233 may generate the fourth skip signal SKIP4 that is activated at a logic "high" level when the skip count signal SKIP_CNT<0:2> set to have a fourth logic bit set is received in synchronization with the fourth falling edge of the clock CLK. The case in which the skip count signal SKIP_CNT<0:2> is set to have the fourth logic bit set may mean a case in which both the first and second bits SKIP_CNT<0:1> of the skip count signal are set to have a logic "low" level and the third bit SKIP_CNT<2> of the skip count signal SKIP_CNT<0:2> is set to have a logic "high" level, but the present disclosure is not limited thereto. The skip decoder 233 may generate the fifth skip signal SKIP5 that is activated at a logic "high" level when the skip count signal SKIP_CNT<0:2> set to have a fifth logic bit set is received in synchronization with the fifth falling edge of the clock CLK. The case in which the skip count signal SKIP_CNT<0:2> is set to have the fifth logic bit set may mean a case in which the first bit SKIP_CNT<0> of the skip count signal SKIP_CNT<0:2> and the third bit SKIP_CNT<2> of the skip count signal SKIP_CNT<0:2> are both set to have a logic "high" level and the second bit SKIP_CNT<1> of the skip count signal SKIP_CNT<0:2> is set to have a logic "low" level, but the present disclosure is not limited thereto. In the present embodiment, the case where the five skip signals SKIP1 to SKIP5 are generated in the skip decoder 233 has been described as an example, but this is only an example and the present disclosure is not limited thereto.

Figure 8:
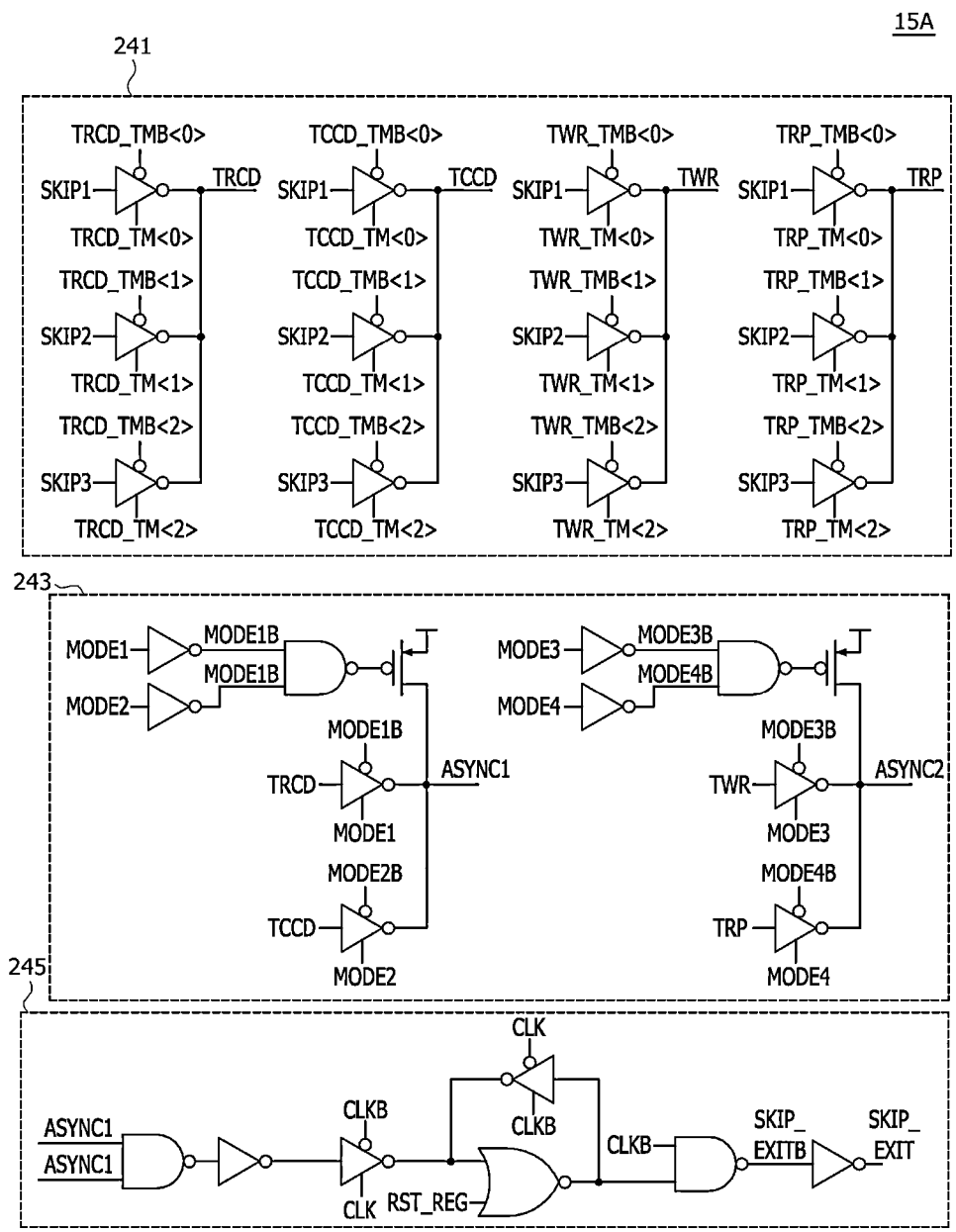
FIG. 8 is a circuit diagram according to an embodiment of a skip exit control circuit included in the semiconductor device shown in FIG. 1.

FIG. 8 is a circuit diagram of a skip exit control circuit 15A according to an example of the skip exit control circuit 15 shown in FIG. 1. As shown in FIG. 8, the skip exit control circuit 15A may comprise a test mode setting circuit 241, a mode setting signal generation circuit 243, and a skip exit signal generation circuit 245.

The test mode setting circuit 241 may generate a first skip setting signal TRCD, a second skip setting signal TCCD, a third skip setting signal TWR, and a fourth skip setting signal TRP from the first skip signal SKIP1, the second skip signal SKIP2, and the third skip signal SKIP3, responsive to the first test mode signal TRCD_TM<0:2>, a first inverted test mode signal TRCD_TMB<0:2>, the second test mode signal TCCD_TM<0:2>, a second inverted test mode signal TCCD_TMB<0:2>, the third test mode signal TWR_TM<0:2>, a third inverted test mode signal TWR_TMB<0:2>, the fourth test mode signal TRP_TM<0:2>, a fourth inverted test mode signal TRP_TMB<0:2>. As used herein, the phrase, "inversely buffer" refers to the buffering and inversion or complementing of a signal. Buffering and inverting an analog or digital signal may be accomplished by an analog inverter. A digital inverter may be used to buffer and invert a purely digital signal.

The test mode setting circuit 241 of the skip exit control circuit 15A may select one of the first skip signal SKIP1, the second skip signal SKIP2, and the third skip signal SKIP3 as a first selection skip signal, responsive to the first test mode signal TRCD_TM<0:2> and the first inverted test mode signal TRCD_TMB<0:2>, The test mode setting circuit 241 may also generate the first skip setting signal TRCD responsive to the first selection skip signal. As an example, the test mode setting circuit 241 may inversely buffer the second skip signal SKIP2 selected as the first selection skip signal in order to generate the first skip setting signal TRCD when the test mode setting circuit 241 receives a second bit TRCD_TM<1> of the first test mode signal activated at a logic "high" level and a second bit TRCD_TMB<1> of the first inverted test mode signal activated at a logic "low" level.

The test mode setting circuit 241 may select one of the first skip signal SKIP1, the second skip signal SKIP2, and the third skip signal SKIP3 as a second selection skip signal, responsive to the second test mode signal TCCD_TM<0:2> and the second inverted test mode signal TCCD_TMB<0:2>, and generate the second skip setting signal TCCD from the second selection skip signal. As an example, the test mode setting circuit 241 may inversely buffer the third skip signal SKIP3 set as the second selection skip signal to generate the second skip setting signal TCCD when a third bit TCCD_TM<2> of the second test mode signal activated at a logic "high" level and a third bit TCCD_TMB<2> of the second inverted test mode signal activated at a logic "low" level are received.

The test mode setting circuit 241 may select one of the first skip signal SKIP1, the second skip signal SKIP2, and the third skip signal SKIP3 as a third selection skip signal, responsive to the third test mode signal TWR_TM<0:2> and the third inverted test mode signal TWR_TMB<0:2> and generate the third skip setting signal TWR based on the third selection skip signal. As an example, the test mode setting circuit 241 may inversely buffer the second skip signal SKIP2 selected as the third selection skip signal to generate the third skip setting signal TWR when test mode setting circuit 241 receives a second bit TWR_TM<1> of the third test mode signal activated at a logic "high" level and a second bit TWR_TMB<1> of the third inverted test mode signal activated at a logic "low" level.

The test mode setting circuit 241 may select one of the first skip signal SKIP1, the second skip signal SKIP2, and the third skip signal SKIP3 as a fourth selection skip signal, responsive to the fourth test mode signal TRP_TM<0:2> and the fourth inverted test mode signal TRP_TMB<0:2>, and generate the fourth skip setting signal TRP based on the fourth selection skip signal. As an example, the test mode setting circuit 241 may inversely buffer the first skip signal SKIP1 set as the fourth selection skip signal to generate the fourth skip setting signal TRP when the test mode setting circuit 241 receives a second bit TRP_TM<0> of the fourth test mode signal activated at a logic "high" level and a second bit TRP_TMB<0> of the fourth inverted test mode signal activated at a logic "low" level.

The mode setting signal generation circuit 243 may be connected to the test mode setting circuit 241 to receive the first skip setting signal TRCD, the second skip setting signal TCCD, the third skip setting signal TWR, and the fourth skip setting signal TRP from the test mode setting circuit 241. The mode setting signal generation circuit 243 may generate a first mode setting signal ASYNC1 and a second mode setting signal ASYNC2 from the first skip setting signal TRCD, the second skip setting signal TCCD, the third skip setting signal TWR, and the fourth skip setting signal TRP, responsive to the first mode signal MODE1, the second mode signal MODE2, the third mode signal MODE3, and the fourth mode signal MODE4.

Figure 11:
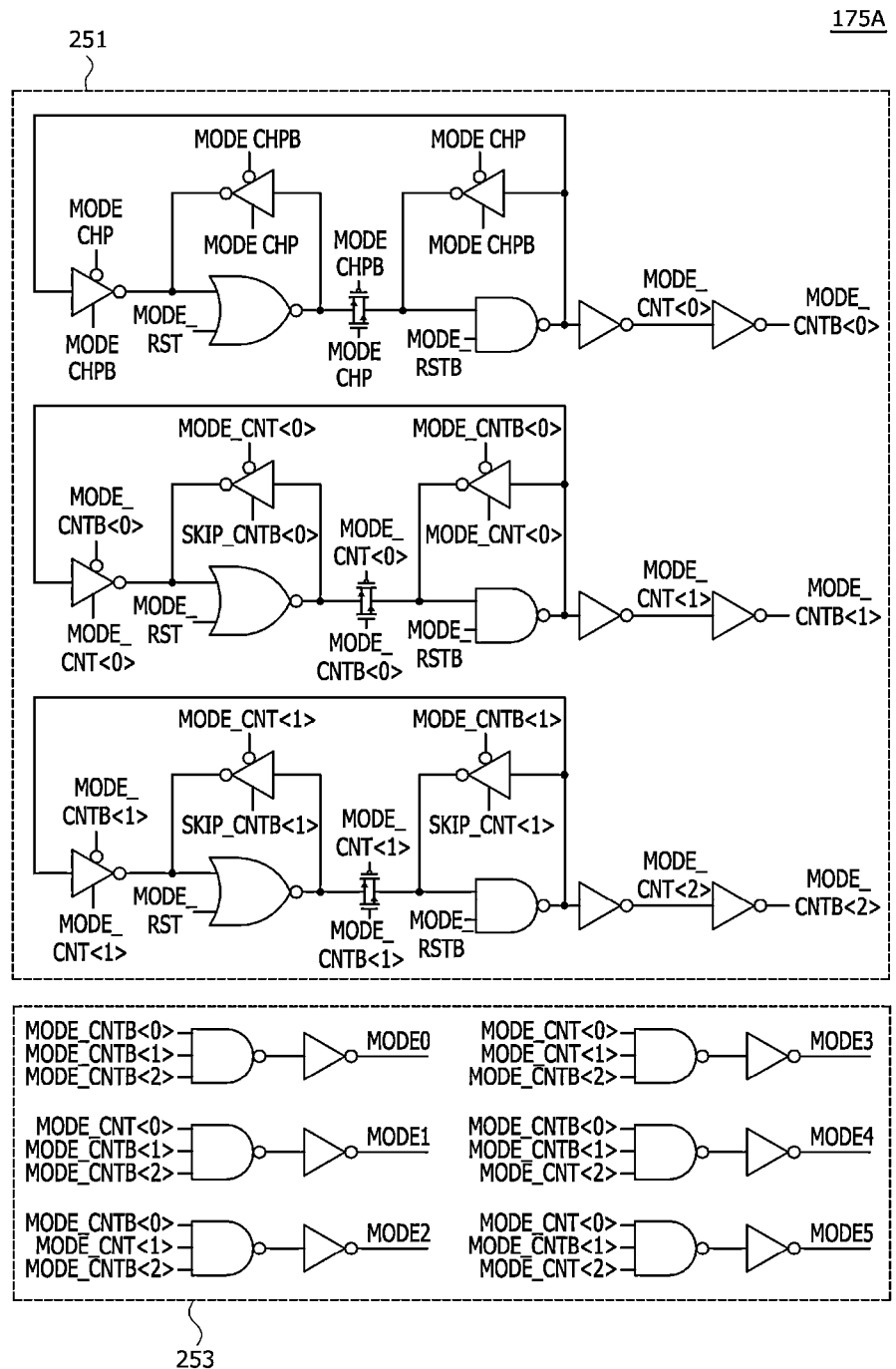
FIG. 11 is a circuit diagram according to an embodiment of a mode signal generation circuit included in the mode control circuit shown in FIG. 9.

The mode setting signal generation circuit 243 may generate the first mode setting signal ASYNC1 and the second mode setting signal ASYNC2 that are both activated at a logic "high" level when the first mode signal MODE1, the second mode signal MODE2, the third mode signal MODE3, and the fourth mode signal MODE4 are all at a logic "low" level in an initial mode (e.g., when MODE0 in FIG. 11 is set to have a logic "high" level).

The mode setting signal generation circuit 243 may inversely buffer the first skip setting signal TRCD to generate the first mode setting signal ASYNC1 and the second mode setting signal ASYNC2 that is activated at a logic "high" level when the first mode signal MODE1 is at a logic "high" level and the first inverted mode signal MODE1B is at a logic "low" level in the first mode. For example, because the second skip signal SKIP2 is buffered and the first mode setting signal ASYNC1 is generated when the second skip signal SKIP2 is inversely buffered and the first skip setting signal TRCD is generated, the first mode setting signal ASYNC1 may be activated at a logic "high" level when the second skip signal SKIP2 is activated at a logic "high" level.

The mode setting signal generation circuit 243 may inversely buffer the second skip setting signal TCCD to generate the first mode setting signal ASYNC1 and the second mode setting signal ASYNC2 that is activated at a logic "high" level when the second mode signal MODE2 is at a logic "high" level and the second inverted mode signal MODE2B is at a logic "low" level in the second mode. For example, because the third skip signal SKIP3 is buffered and the first mode setting signal ASYNC1 is generated when the third skip signal SKIP3 is inversely buffered and the second skip setting signal TCCD is generated, the first mode setting signal ASYNC1 may be activated at a logic "high" level when the third skip signal SKIP3 is activated at a logic "high" level.

The mode setting signal generation circuit 243 may inversely buffer the third skip setting signal TWR to generate the second mode setting signal ASYNC2 and the first mode setting signal ASYNC1 that is activated at a logic "high" level when the third mode signal MODE3 is at a logic "high" level and the third inverted mode signal MODE3B is at a logic "low" level in the third mode. For example, because the second skip signal SKIP2 is buffered and the second mode setting signal ASYNC2 is generated when the second skip signal SKIP2 is inversely buffered and the third skip setting signal TWR is generated, the second mode setting signal ASYNC2 may be activated at a logic "high" level when the second skip signal SKIP2 is activated at a logic "high" level.

The mode setting signal generation circuit 243 of the skip exit control circuit 15A may inversely buffer the fourth skip setting signal TRP to generate the second mode setting signal ASYNC2 and the first mode setting signal ASYNC1 that is activated at a logic "high" level when the fourth mode signal MODE4 is at a logic "high" level and the fourth inverted mode signal MODE4B is at a logic "low" level in the fourth mode. For example, because the first skip signal SKIP1 is buffered and the second mode setting signal ASYNC2 is generated when the first skip signal SKIP1 is inversely buffered and the fourth skip setting signal TRP is generated, the second mode setting signal ASYNC2 may be activated at a logic "high" level when the first skip signal SKIP1 is activated at a logic "high" level.

The skip exit signal generation circuit 245 of the skip exit control circuit 15A may be connected to the mode setting signal generation circuit 243 to receive the first mode setting signal ASYNC1 and the second mode setting signal ASYNC2 from the mode setting signal generation circuit 243. The skip exit signal generation circuit 245 may generate the skip exit signal SKIP_EXIT and the inverted skip exit signal SKIP_EXITB, responsive to the first mode setting signal ASYNC1, the second mode setting signal ASYNC2, the reset regulating signal RST_REG, the clock CLK, and the inverted clock CLKB. The skip exit signal generation circuit 245 may generate the inverted skip exit signal SKIP_EXITB that is activated at a logic "low" level and the skip exit signal SKIP_EXIT that is activated at a logic "high" level in synchronization with the rising edge of the clock CLK after both the first mode setting signal ASYNC1 and the second mode setting signal ASYNC2 are activated.

Figure 9:
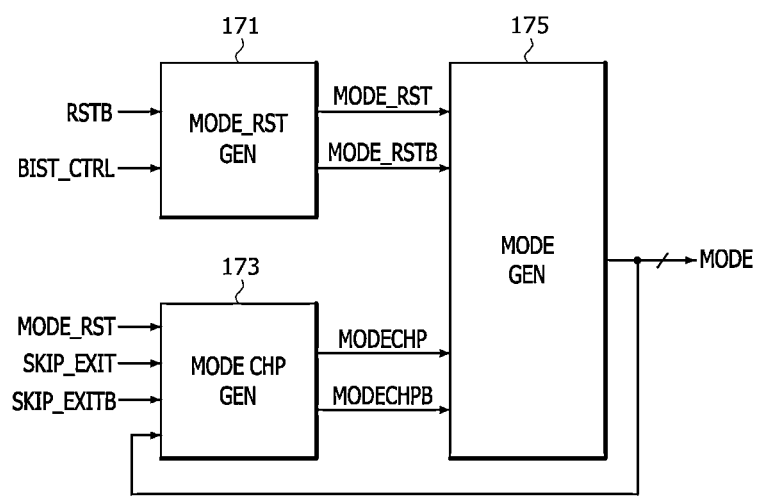
FIG. 9 is a block diagram illustrating a configuration according to an embodiment of a mode control circuit included in the semiconductor device shown in FIG. 1.

FIG. 9 is a block diagram illustrating a configuration of a mode control circuit 17A according to an embodiment of the mode control circuit 17 shown in FIG. 1. As shown in FIG. 9, the mode control circuit 17A may comprise a mode reset signal generation circuit (MODE_RST GEN) 171, a mode change pulse generation circuit (MODE_CHP GEN) 173, and a mode signal generation circuit (MODE GEN) 175.

The mode reset signal generation circuit 171 may generate the mode reset signal MODE_RST and the inverted mode reset signal MODE_RSTB, responsive to the inverted reset signal RSTB and the end command BIST_CTRL. The mode reset signal generation circuit 171 may generate the mode reset signal MODE_RST and the inverted mode reset signal MODE_RSTB that are activated when one of the inverted mode reset signal MODE_RSTB and the end command BIST_CTRL is activated. The inverted reset signal RSTB may be activated for the initialization operation of the semiconductor device (1 of FIG. 1).

The mode change pulse generation circuit 173 may be connected to the mode reset signal generation circuit 171 and the mode signal generation circuit 175. The mode change pulse generation circuit 173 may receive the mode reset signal MODE_RST output from the mode reset signal generation circuit 171 and receive the mode signal MODE from the mode signal generation circuit 175. The mode change pulse generation circuit 173 may generate the mode change pulse MODE_CHP and the inverted mode change pulse MODE_CHPB, responsive to the mode reset signal MODE_RST, the skip exit signal SKIP_EXIT, the inverted skip exit signal SKIP_EXITB, and responsive to the mode signal MODE, which is output from the mode signal generation circuit 175. The mode change pulse generation circuit 173 may generate the mode change pulse MODE_CHP and the inverted mode change pulse MODE_CHPB that are deactivated when the mode reset signal MODE_RST is activated. The mode change pulse generation circuit 173 may generate the mode change pulse MODE_CHP and the inverted mode change pulse MODE_CHPB that are activated to change the mode whenever at least one of the skip exit signal SKIP_EXIT and the inverted skip exit signal SKIP_EXITB are activated, until entering the preset final mode, responsive to the mode signal MODE. As an example, the mode change pulse generation circuit 173 may generate the mode change pulse MODE_CHP and the inverted mode change pulse MODE_CHPB that are activated to enter the first mode when at least one of the skip exit signal SKIP_EXIT and the inverted skip exit signal SKIP_EXITB are activated for the first time. Further, the mode change pulse generation circuit 173 may generate the mode change pulse MODE_CHP and the inverted mode change pulse MODE_CHPB that are activated to enter the second mode when the skip exit signal SKIP_EXIT and the inverted skip exit signal SKIP_EXITB are activated for the second time. When entering the preset final mode responsive to the mode signal MODE, the mode change pulse generation circuit 173 may generate the mode change pulse MODE_CHP and the inverted mode change pulse MODE_CHPB that are deactivated when at least one of the skip exit signal SKIP_EXIT and the inverted skip exit signal SKIP_EXITB is activated.

The mode signal generation circuit 175 may be connected to the mode reset signal generation circuit 171 and the mode change pulse generation circuit 173. The mode signal generation circuit 175 may receive the mode reset signal MODE_RST and the inverted mode reset signal MODE_RSTB from the mode reset signal generation circuit 171 and receive the mode change pulse MODE_CHP and the inverted mode change pulse MODE_CHPB from the mode change pulse generation circuit 173. The mode signal generation circuit 175 may generate the mode signal MODE, responsive to the mode reset signal MODE_RST, the inverted mode reset signal MODE_RSTB, the mode change pulse MODE CHP, and the inverted mode change pulse MODE CHPB. The mode signal generation circuit 175 may generate the mode signal MODE that is initialized when at least one of the mode reset signal MODE_RST and the inverted mode reset signal MODE_RSTB are activated. As an example, the mode signal generation circuit 175 may generate an initialized mode signal MODE when at least one of the mode reset signal MODE_RST and the inverted mode reset signal MODE_RSTB is activated to enter the initial mode (e.g., MODE0 in FIG. 11). The mode signal generation circuit 175 may generate the mode signal MODE to change the mode when at least one of the mode change pulse MODE_CHP and the inverted mode change pulse MODE_CHPB is activated until entering the preset final mode responsive to the mode signal MODE. As an example, the mode signal generation circuit 175 may generate the mode signal MODE for entering the first mode when at least one off the skip exit signal SKIP_EXIT and the inverted skip exit signal SKIP_EXITB is activated for the first time, and may generate the mode signal MODE for entering the second mode when at least one of the skip exit signal SKIP_EXIT and the inverted skip exit signal SKIP_EXITB are activated for the second time. The mode signal generation circuit 175 may generate the mode signal MODE to maintain the mode when entering the preset final mode responsive to the mode signal MODE.

Figure 10:
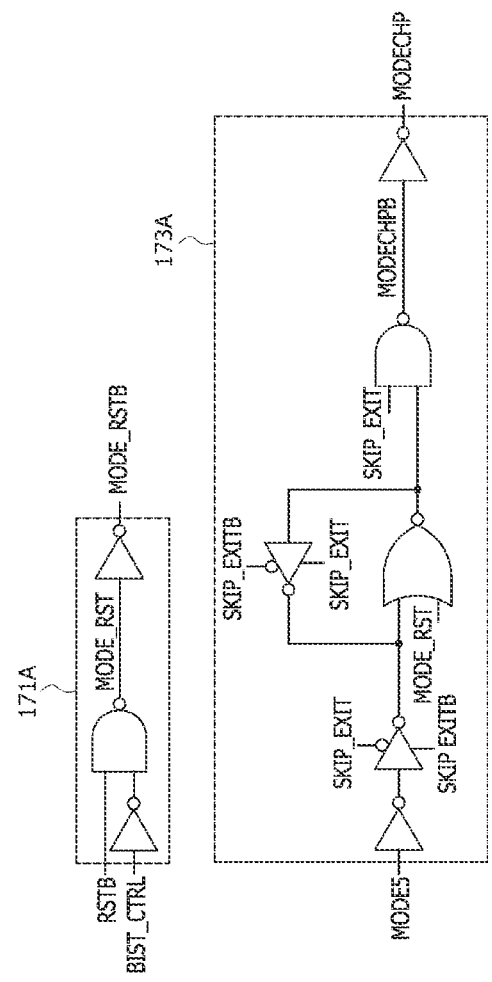
FIG. 10 is a circuit diagram according to an embodiment of a mode reset signal generation circuit and a mode change pulse generation circuit included in the mode control circuit shown in FIG. 9.

FIG. 10 is a circuit diagram of a mode reset signal generation circuit 171A and a mode change pulse generation circuit 173A according to embodiments of the mode reset signal generation circuit 171 and the mode change pulse generation circuit 173 shown in FIG. 9.

As shown in FIG. 10, the mode reset signal generation circuit 171A may generate the mode reset signal MODE_RST that is activated at a logic "high" level and the inverted mode reset signal MODE_RSTB that is activated at a logic "low" level when the inverted reset signal RSTB is activated at a logic "low" level for the initialization operation of the semiconductor device 1 of FIG. 1. In addition, the mode reset signal generation circuit 171A may generate the mode reset signal MODE_RST that is activated at a logic "high" level and the inverted mode reset signal MODE_RSTB that is activated at a logic "low" level when the end command BIST_CTRL is activated at a logic "high" level.

As shown in FIG. 10, the mode change pulse generation circuit 173A may generate the mode change pulse MODE_CHP that is deactivated at a logic "low" level and the inverted mode change pulse MODE_CHPB that is deactivated at a logic "high" level when the mode reset signal MODE_RST that is activated at a logic "high" level is received. In addition, the mode change pulse generation circuit 173A may generate the mode change pulse that is activated at a logic "high" level and the inverted mode change pulse MODE_CHPB that is activated at a logic "low" level to change sequentially from the first mode to the fifth mode when at least one of the skip exit signal SKIP_EXIT and the inverted skip exit signal SKIP_EXITB is activated in a state in which the fifth mode is not entered and the fifth mode signal MODE5 is at a logic "low" level. In addition, the mode change pulse generation circuit 173A may generate the mode change pulse MODE_CHP that is deactivated at a logic "low" level and the inverted mode change pulse MODE_CHPB that is deactivated at a logic "high" level when the skip exit signal SKIP_EXIT or the inverted skip exit signal SKIP_EXITB are activated in a state in which the fifth mode is entered and the fifth mode signal MODE5 is at a logic "high" level.

FIG. 11 is a circuit diagram of a mode signal generation circuit 175A according to an embodiment of the mode signal generation circuit 175 shown in FIG. 9. As shown in FIG. 11, the mode signal generation circuit 175A may include a mode counter 251 and a mode decoder 253.

The mode counter 251 may generate a mode count signal MODE_CNT<0:2> and an inverted mode count signal MODE_CNTB<0:2>, responsive to the mode reset signal MODE_RST, the inverted mode reset signal MODE_RSTB, the mode change pulse MODE CHP, and the inverted mode change pulse MODE CHPB. The mode counter 251 may generate the mode count signal MODE_CNT<0:2> that is initialized at a logic "low" level and the inverted mode count signal MODE_CNTB<0:2> that is initialized at a logic "high" level when the mode reset signal MODE_RST is activated at a logic "high" level and the inverted mode reset signal MODE_RSTB is activated at a logic "low" level. The mode counter 251 may count when the mode change pulse MODE_CHP is activated at a logic "high" level and the inverted mode change pulse MODE_CHPB is activated at a logic "low" level in a state in which the mode reset signal MODE_RST is deactivated at a logic "low" level and the inverted mode reset signal MODE_RSTB is deactivated at a logic "high" level to generate the mode count signal MODE_CNT<0:2> and the inverted mode count signal MODE_CNTB<0:2> whose logic bit sets vary sequentially. As an example, the mode counter 251 may generate the mode count signal MODE_CNT<0:2> that is set to have a first logic bit set when at least one of the mode change pulse MODE_CHP and the inverted mode change pulse MODE_CHPB is activated for the first time, and may generate the mode count signal MODE_CNT<0:2> that is set to have a second logic bit set when at least one of the mode change pulse MODE_CHP and the inverted mode change pulse MODE_CHPB is activated for the second time.

The mode decoder 253 may be connected to the mode counter 251 to receive the mode count signal MODE_CNT<0:2> and the inverted mode count signal MDE_CNTB<0:2> from the mode counter 251. The mode decoder 253 may decode the mode count signal MODE_CNT<0:2> and the inverted mode count signal MDE_CNTB<0:2> to generate the initial mode signal MODE0, the first mode signal MODE1, the second mode signal MODE2, the third mode signal MODE3, the fourth mode signal MODE4, and the fifth mode signal MODE5. The mode decoder 253 may generate the initial mode signal MODE0 that is activated at a logic "high" level when the inverted mode count signal MODE_CNTB<0:2> is initialized at a logic "high" level. The mode decoder 253 may generate the first mode signal MODE1 that is activated at a logic "high" level when at least one of the mode change pulse MODE_CHP and the inverted mode change pulse MODE_CHPB is activated for the first time and the mode count signal MODE_CNT<0:2> set to have a first logic bit set is input to the mode decoder 253. The case in which the mode count signal MODE_CNT<0:2> is set to have the first logic bit set may mean a case in which the first bit MODE_CNT<0> of the mode count signal is set to have a logic "high" level and the second and third bits MODE_CNT<1:2> of the mode count signal are both set to have a logic "low" level, but the present disclosure is not limited thereto.

The mode decoder 253 may generate the second mode signal MODE2 that is activated at a logic "high" level when the mode change pulse MODE_CHP and the inverted mode change pulse MODE_CHPB are activated for the second time and the mode count signal MODE_CNT<0:2> set to have a second logic bit set is received. The case in which the mode count signal MODE_CNT<0:2> is set to have the second logic bit set may mean a case in which the second bit MODE_CNT<1> of the mode count signal is set to have a logic "high" level and both the first bit MODE_CNT<0> of the mode count signal and the third bit MODE_CNT<2> of the mode count signal are set to have a logic "low" level, but the present disclosure is not limited thereto.

The mode decoder 253 may generate the third mode signal MODE3 that is activated at a logic "high" level when at least one of the mode change pulse MODE_CHP and the inverted mode change pulse MODE_CHPB is activated for the third time and the mode count signal MODE_CNT<0:2> set to have a third logic bit set is input to the mode decoder 253. The case in which the mode count signal MODE_CNT<0:2> is set to have the third logic bit set may mean a case in which both the first bit MODE_CNT<0> of the mode count signal and the second bit MODE_CNT<1> of the mode count signal are set to have a logic "high" level and the third bit MODE_CNT<2> of the mode count signal is set to have a logic "low" level, but the present disclosure is not limited thereto.

The mode decoder 253 may generate the fourth mode signal MODE4 that is activated at a logic "high" level when at least one of the mode change pulse MODE_CHP and the inverted mode change pulse MODE_CHPB is activated for the fourth time and the mode count signal MODE_CNT<0:2> set to have a fourth logic bit set is input to the mode decoder 253. The case in which the mode count signal MODE_CNT<0:2> is set to have the fourth logic bit set may mean a case in which the third bit MODE_CNT<2> of the mode count signal is set to have a logic "high" level and both the first and second bits MODE_CNT<0:1> of the mode count signal are set to have a logic "low" level, but the present disclosure is not limited thereto.

The mode decoder 253 may generate the fifth mode signal MODE5 that is activated at a logic "high" level when at least one of the mode change pulse MODE_CHP and the inverted mode change pulse MODE_CHPB is activated for the fifth time and the mode count signal MODE_CNT<0:2> set to have a fifth logic bit set is input to the mode decoder 253. The case in which the mode count signal MODE_CNT<0:2> is set to have the fifth logic bit set may mean a case in which both the first bit MODE_CNT<0> and the third bit MODE_CNT<2> of the mode count signal are set to have a logic "high" level and the second bit MODE_CNT<1> of the mode count signal is set to have a logic "low" level, but the present disclosure is not limited thereto.

Figure 12:
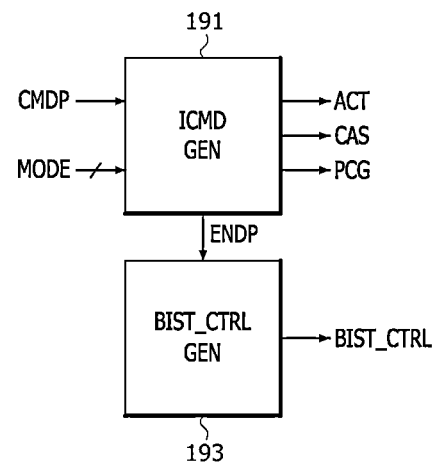
FIG. 12 is a block diagram illustrating a configuration according to an embodiment of a command control circuit included in the semiconductor device shown in FIG. 1.

FIG. 12 is a block diagram illustrating a configuration of a command control circuit 19A according to an embodiment of the command control circuit 19 shown in FIG. 1. As described below, the command control circuit 19A is configured to generate internal commands for each mode responsive to the mode signal MODE. As shown in FIG. 12, the command control circuit 19A may include an internal command generation circuit (ICMD GEN) 191 and an end command generation circuit (BIST_CTRL GEN) 193.

The internal command generation circuit 191 may generate the active command ACT, the CAS command CAS, the precharge command PCG, and an end pulse ENDP, responsive to the command pulse CMDP and the mode signal MODE. The internal command generation circuit 191 may generate the active command ACT that is activated when entering the first mode, responsive to the mode signal MODE in a state in which the command pulse CMDP is activated. The active command ACT may be activated to perform an active operation to access a memory cell (not shown) included in the semiconductor device (1 of FIG. 1). The internal command generation circuit 191 may generate the CAS command that is activated when entering the second mode, responsive to the mode signal MODE in a state in which the command pulse CMDP is activated. The CAS command may be activated to perform column operations such as a read operation and a write operation in the semiconductor device (1 of FIG. 1). The internal command generation circuit 191 may generate the precharge command PCG that is activated when entering the fourth mode, responsive to the mode signal MODE in a state in which the command pulse CMDP is activated. The precharge command PCG may be activated to perform a precharge operation in the semiconductor device (1 of FIG. 1). The internal command generation circuit 191 may generate the end pulse ENDP that is activated when entering the fifth mode, responsive to the mode signal MODE in a state in which the command pulse CMDP is activated.

The end command generation circuit 193 may be connected to the internal command generation circuit 191 to receive the end pulse ENDP from the internal command generation circuit 191. The end command generation circuit 193 may generate the end command BIST_CTRL, responsive to the end pulse ENDP. The end command generation circuit 193 may generate the end command BIST_CTRL that is activated when a preset end delay section has elapsed after the end pulse ENDP is activated.

Figure 13:
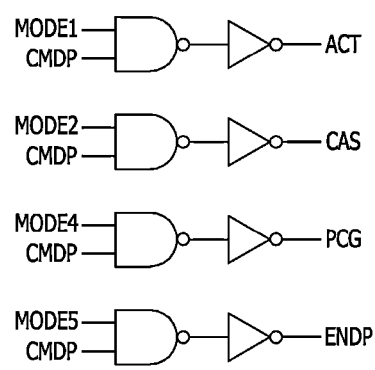
FIG. 13 is a circuit diagram according to an embodiment of an internal command generation circuit included in the command control circuit shown in FIG. 12.

FIG. 13 is a circuit diagram of an internal command generation circuit 191A according to an embodiment of the internal command generation circuit 191 shown in FIG. 12.

As shown in FIG. 13, the internal command generation circuit 191A may generate the active command ACT that is activated at a logic "high" level when the first mode signal MODE1 is activated at a logic "high" level to enter the first mode in a state in which the command pulse CMDP is activated at a logic "high" level. The internal command generation circuit 191A may generate the CAS command that is activated at a logic "high" level when the second mode signal MODE2 is activated at a logic "high" level to enter the second mode in a state in which the command pulse CMDP is activated at a logic "high" level. The internal command generation circuit 191A may generate the precharge command PCG that is activated at a logic "high" level when the fourth mode signal MODE4 is activated at a logic "high" level to enter the fourth mode in a state in which the command pulse CMDP is activated at a logic "high" level. The internal command generation circuit 191A may generate the end pulse ENDP that is activated at a logic "high" level when the fifth mode signal MODE5 is activated at a logic "high" level to enter the fifth mode in a state in which the command pulse CMDP is activated at a logic "high" level.

Figure 14:
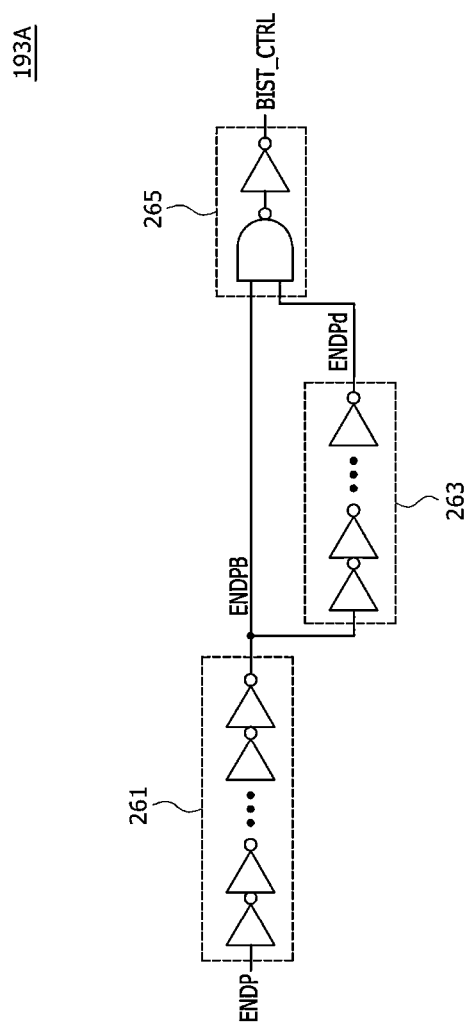
FIG. 14 is a circuit diagram according to an embodiment of an end command generation circuit included in the command control circuit shown in FIG. 12.

FIG. 14 is a circuit diagram of an end command generation circuit 193A according to an embodiment of the end command generation circuit 193 shown in FIG. 12. As shown in FIG. 14, the end command generation circuit 193A may include an end pulse delay circuit 261, an end pulse inversion delay circuit 263, and an end command output circuit 265.

The end pulse delay circuit 261 may delay the end pulse ENDP to generate a delayed end pulse ENDPd. The end pulse inversion delay circuit 263 may invert and delay the delayed end pulse ENDPd to generate an inverted delay end pulse ENDPdB. The end command output circuit 265 may generate the end command BIST_CTRL that is activated at a logic "high" level when both the delayed end pulse ENDPd and the inverted delay end pulse ENDPdB are set to have a logic "high" level.

Figure 15:
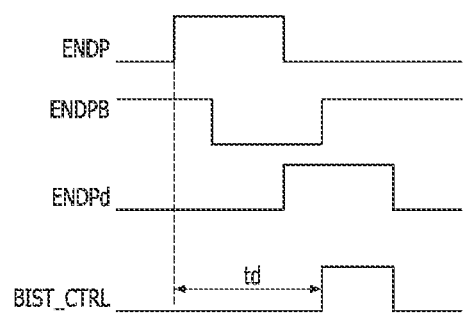
FIG. 15 is a timing diagram illustrating an operation of the end command generation circuit shown in FIG. 14.

FIG. 15 is a timing diagram illustrating an operation of the end command generation circuit 193A shown in FIG. 14. As shown in FIGS. 14 and 15, the end pulse delay circuit 261 may invert and delay the end pulse ENDP to generate the inverted end pulse ENDPB. The end pulse inversion delay circuit 263 may invert and delay the inverted end pulse ENDPB to generate the delayed end pulse ENDPd. The end command output circuit 265 may generate the end command BIST_CTRL that is activated at a logic "high" level when both the inverted end pulse ENDPB and the delayed end pulse ENDPd are set to have a logic "high" level. The end command generation circuit 193A may generate the end command BIST_CTRL that is activated when an end delay section td has elapsed from a time point when the end pulse ENDP is generated.

FIGS. 16 to 21 are timing diagrams illustrating an internal command generating operation of the semiconductor device 1 described in FIGS. 1 to 15, and FIGS. 22 to 33 are circuit diagrams illustrating the internal command generating operation of the semiconductor device 1.

Figure 16:
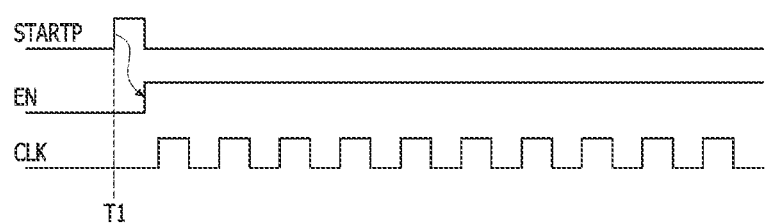
FIGS. 16 to 21 are timing diagrams illustrating an internal command generating operation of the semiconductor device described in FIGS. 1 to 15.
Figure 22:
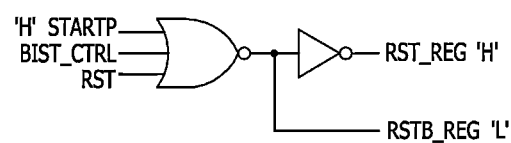
FIGS. 22 to 33 are circuit diagrams illustrating the internal command generating operation of the semiconductor device described in FIGS. 1 to 15.

Referring to FIGS. 16 and 22, the reset regulating signal generation circuit 111A may generate an inverted reset regulating signal RST_REGB that is activated at a logic "low" level 'L' and a reset regulating signal RST_REG that is activated at a logic "high" level 'H' when the start pulse STARTP is activated at a logic "high" level 'H' to start the test mode to generate the internal commands ACT, CAS, PCG, and BIST_CTRL.

Figure 23:
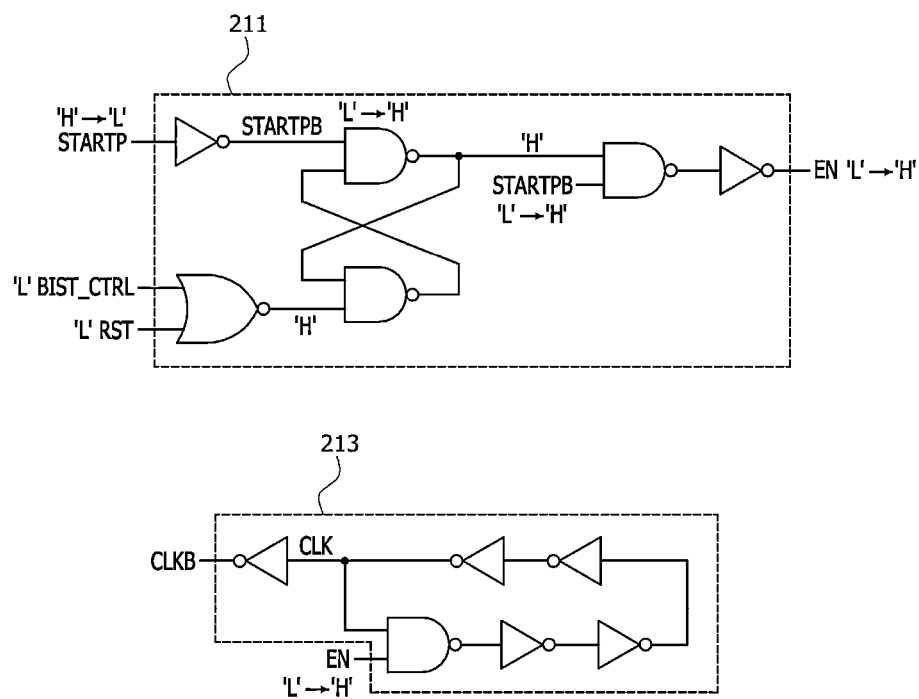

Referring to FIGS. 16 and 23, the clock section signal generation circuit 211 may generate the inverted start pulse STARTPB that is set to have a logic "low" level 'L' when the start pulse STARTP is activated at a logic "high" level 'H', and may generate the clock section signal EN that is activated at a logic "high" level 'H' according to the inverted start pulse STARTPB set to have a logic "high" level 'H' when the start pulse STARTP transitions from a logic "high" level 'H' to a logic "low" level 'L'. The oscillator 213 may generate the clock CLK and the inverted clock CLKB that toggle when the clock section signal EN is activated at a logic "high" level 'H'.

Figure 17:
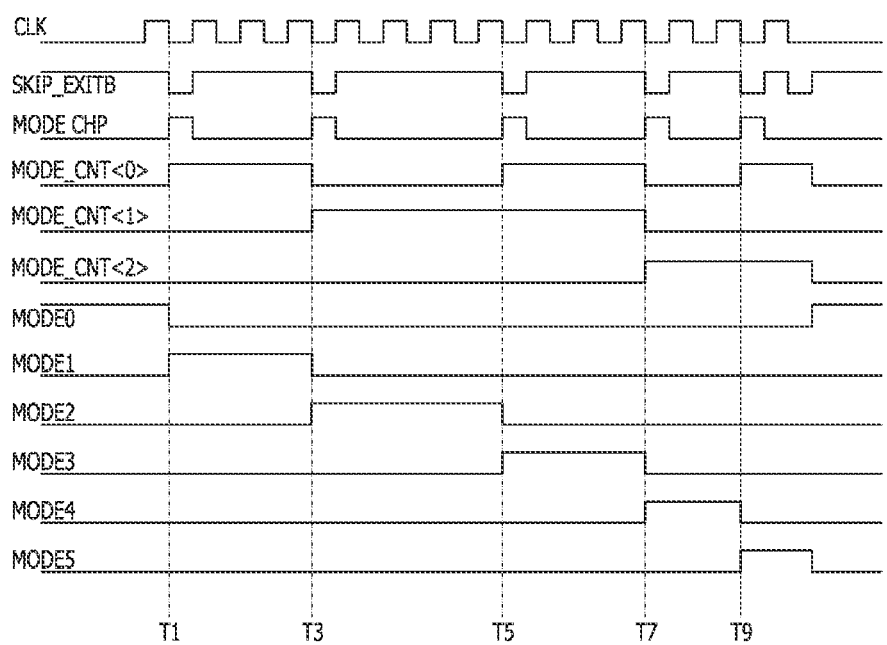
Figure 24:
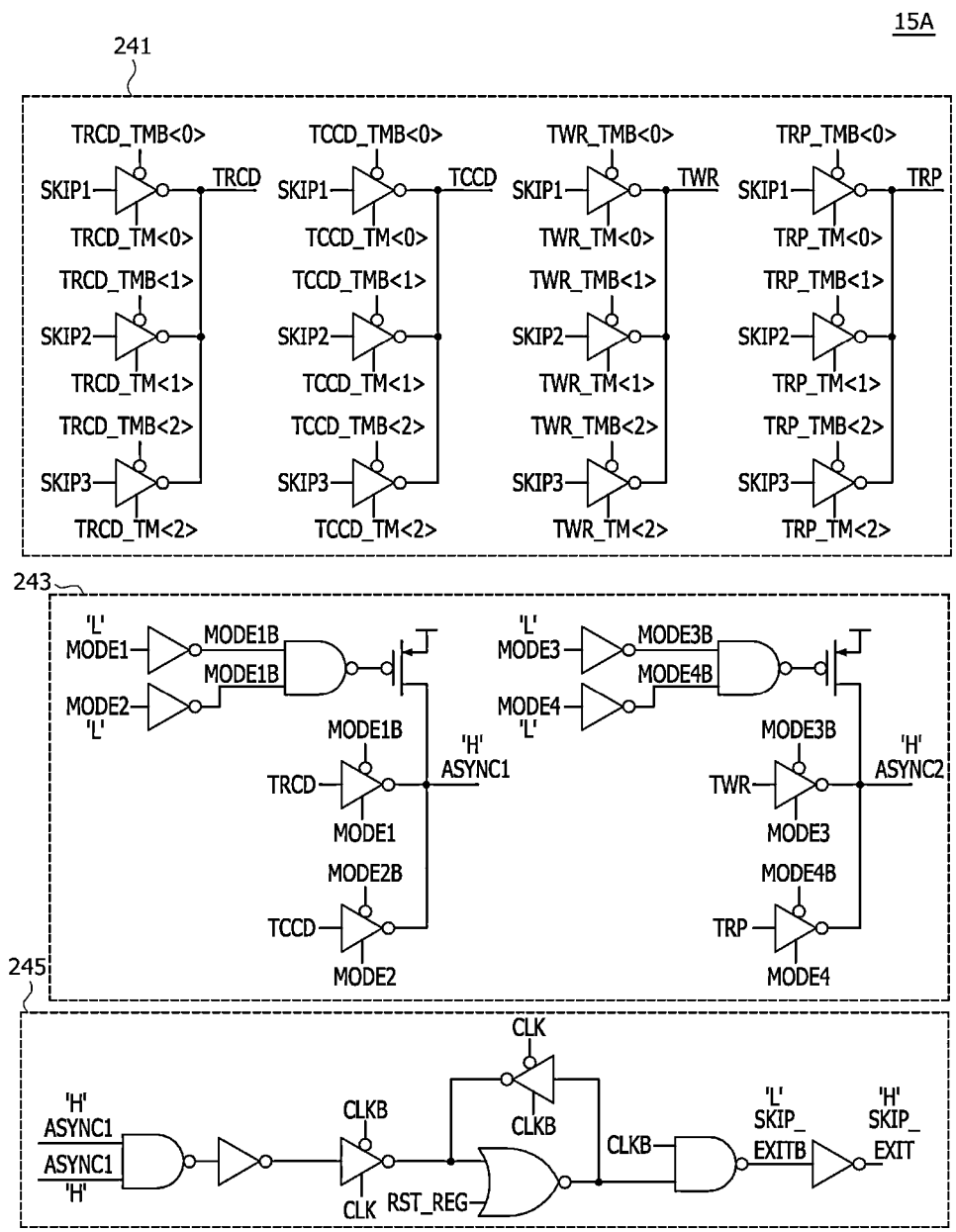

Referring to FIGS. 17 and 24, in the section before a time point T1, when the initial mode signal MODE0 is set to have a logic "high" level 'H' and the first mode signal MODE1, the second mode signal MODE2, the third mode signal MODE3, and the fourth mode signal MODE4 are all set to have a logic "low" level 'L', the mode setting signal generation circuit 243 may generate the first mode setting signal ASYNC1 and the second mode setting signal ASYNC2 that are both activated at a logic "high" level 'H'. The skip exit signal generation circuit 245 may generate the inverted skip exit signal SKIP_EXITB that is activated at a logic "low" level 'L' and the skip exit signal SKIP_EXIT that is activated at a logic "high" level 'H' in synchronization with T1, the time point at which the clock CLK transitions from a logic "high" level to a logic "low" level (hereinafter, referred to as 'falling edge') in a state in which both the first mode setting signal ASYNC1 and the second mode setting signal ASYNC2 are activated at a logic "high" level 'H'.

Figure 25:
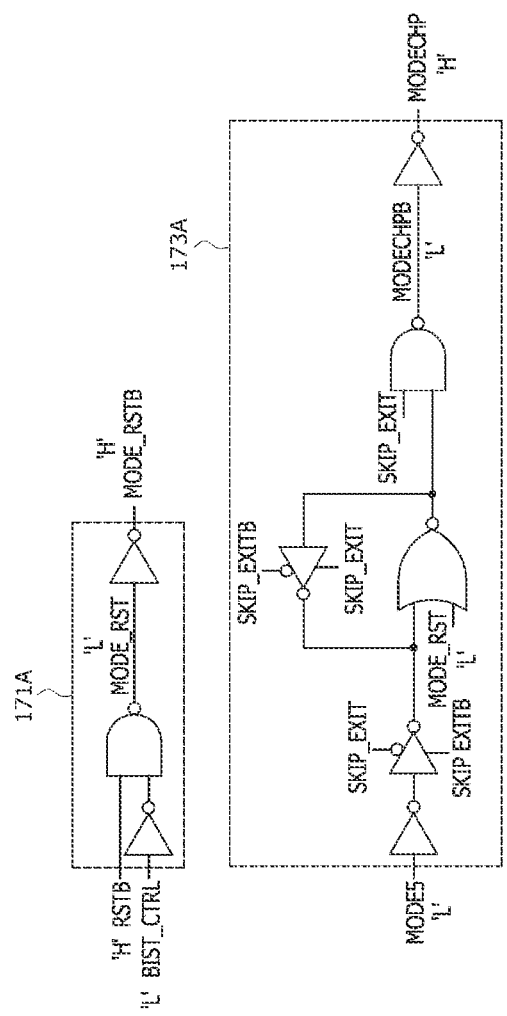

Referring to FIGS. 17 and 25, in the section before T1, which is in the initial mode, the mode reset signal generation circuit 171A may generate the mode reset signal MODE_RST that is deactivated at a logic "low" level 'L' and the inverted mode reset signal MODE_RSTB that is deactivated at a logic "high" level 'H' according to the inverted reset signal RSTB that is deactivated at a logic "high" level 'H' and the end command BIST_CTRL that is deactivated at a logic "low" level 'L'. In addition, the mode change pulse generation circuit 173A may generate the mode change pulse MODE_CHP that is activated at a logic "high" level 'H' and the inverted mode change pulse MODE_CHPB that is activated at a logic "low" level 'L' according to the fifth mode signal MODE5 that is deactivated at a logic "low" level 'L' and the mode reset signal MODE_RST that is deactivated at a logic "low" level 'L' at the time point T1, the falling edge of the inverted skip exit signal SKIP_EXITB.

Figure 26:
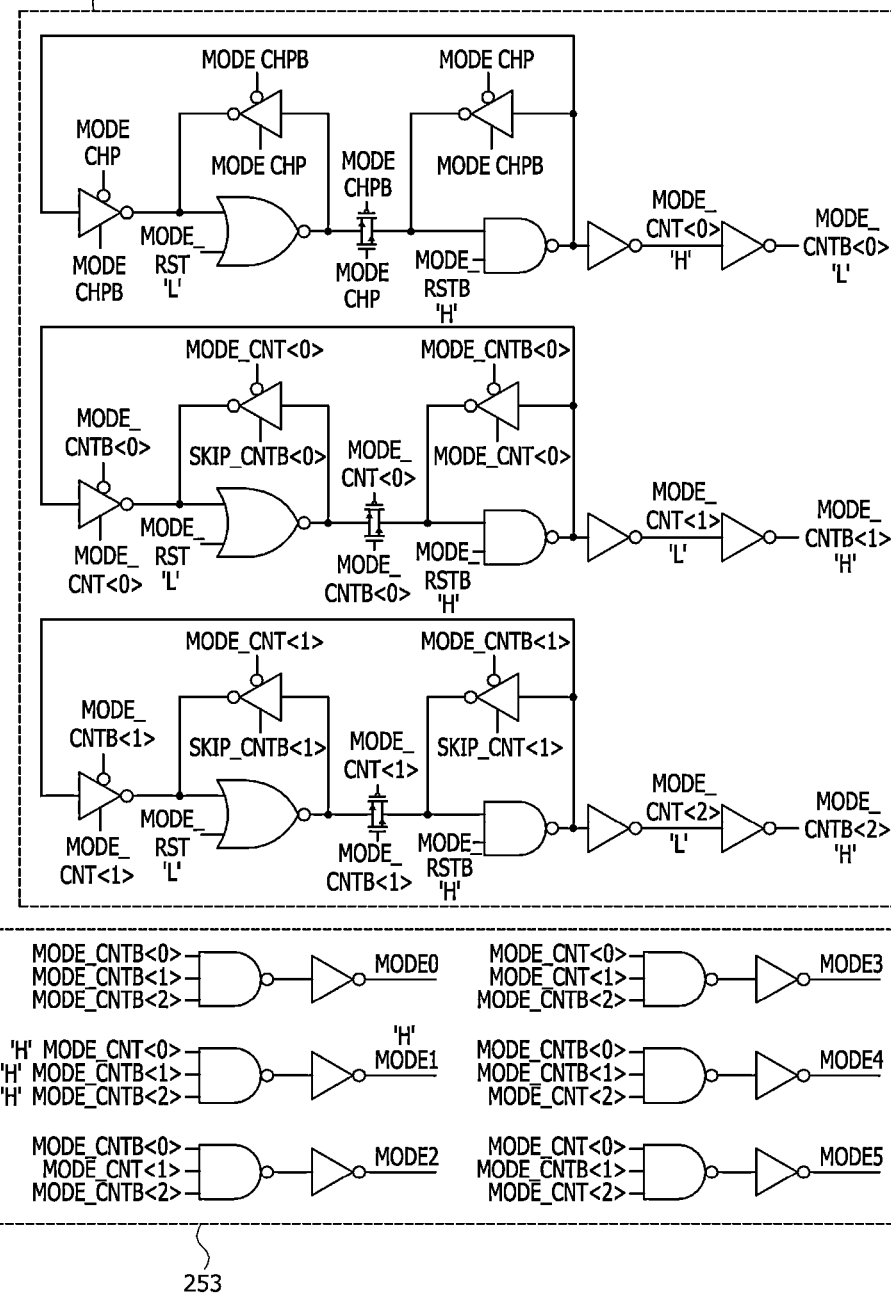

Referring to FIGS. 17 and 26, at the time point T1, the mode counter 251 may set the first bit MODE_CNT<0> of the mode count signal MODE_CNT<0:2> to a logic "high" level and the first bit MODE_CNTB<0> of the inverted mode count signal MODE_CNTB<0:2> to a logic "low" level according to the mode change pulse MODE_CHP that is activated at a logic "high" level 'H' and the inverted mode change pulse MODE_CHPB that is activated at a logic "low" level 'L' in a state in which the mode reset signal MODE_RST is deactivated at a logic "low" level 'L' and the inverted mode reset signal MODE_RSTB is deactivated at a logic "high" level 'H'. In this case, the second and third bits MODE_CNT<1:2> of the mode count signal MODE_CNT<0:2> may maintain the initialized logic "low" level 'L', and the second and third bits MODE_CNTB<1:2> of the inverted mode count signal MODE_CNTB<0:2> may maintain the initialized logic "high" level 'H'. Accordingly, the mode decoder 253 may generate the first mode signal MODE1 that is activated at a logic "high" level 'H' by the first bit MODE_CNT<0> of the mode count signal MODE_CNTB<0:2> and the second and third bits of the inverted mode count signal MODE_CNTB<1:2>, all set to have a logic "high" level 'H'. At the time point T1, because the first mode signal MODE1 is activated at a logic "high" level 'H', the semiconductor device 1 of FIG. 1 may enter the first mode.

Figure 18:
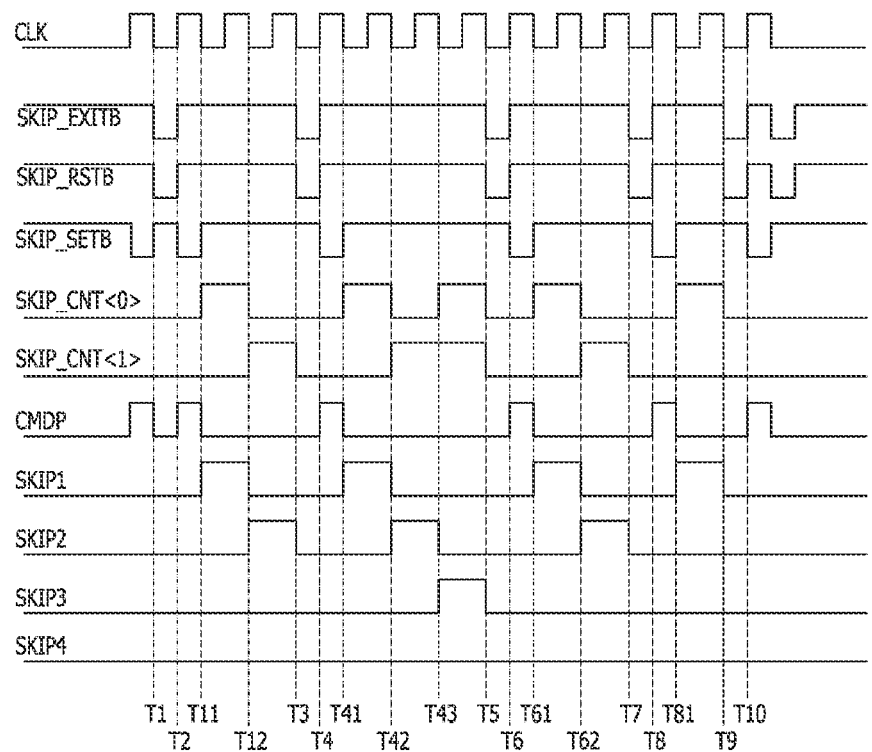
Figure 27:
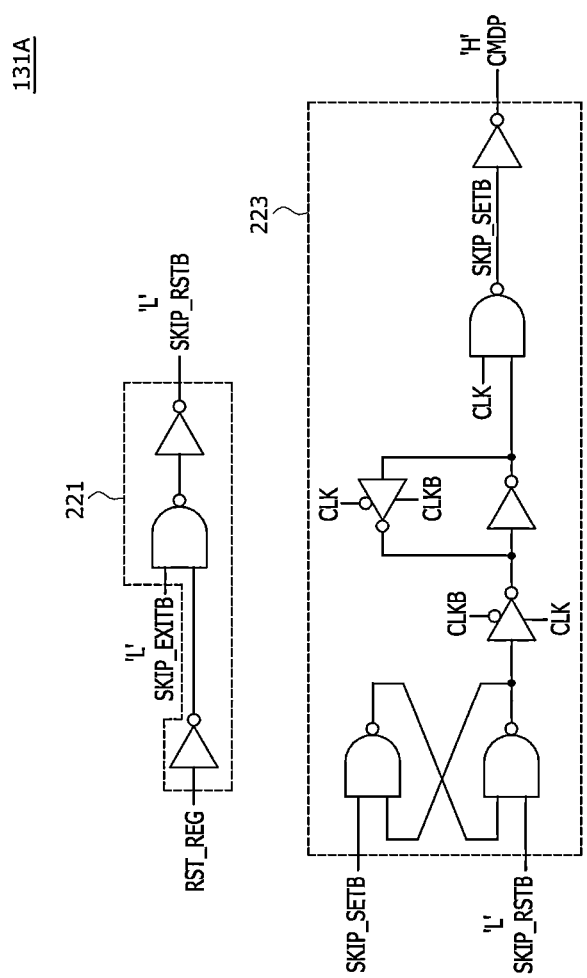

Referring to FIGS. 18 and 27, at the time point T1, the skip initialization signal generation circuit 221 may generate the inverted skip reset signal SKIP_RSTB that is activated at a logic "low" level 'L' by the inverted skip exit signal SKIP_EXITB that is activated at a logic "low" level 'L'. Accordingly, the command pulse generation circuit 223 may generate the command pulse CMDP that is activated at a logic "high" level 'H' at a time point T2, the rising edge of the clock CLK, after the inverted skip reset signal SKIP_RSTB is activated at a logic "low" level 'L'.

Figure 19:
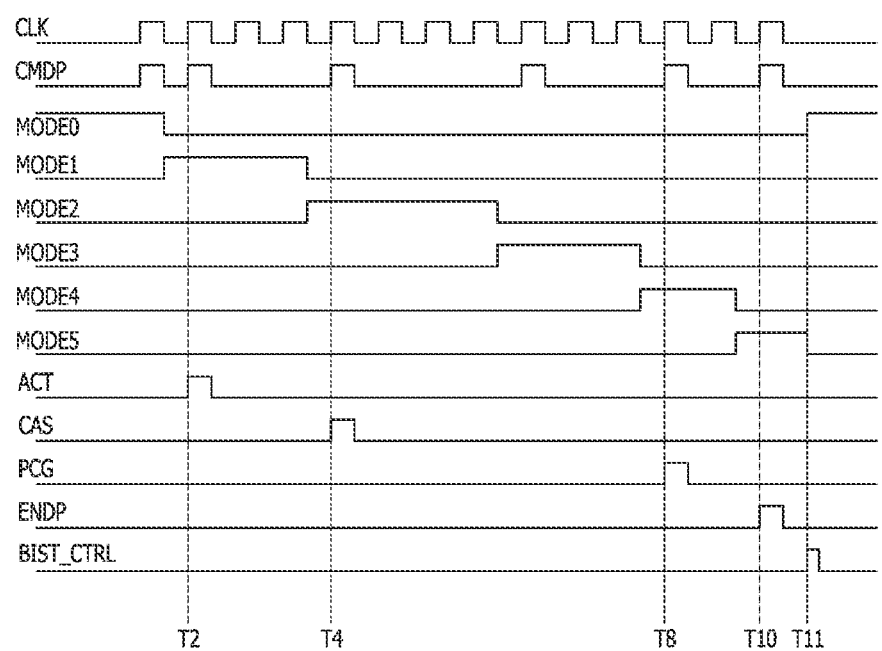
Figure 28:
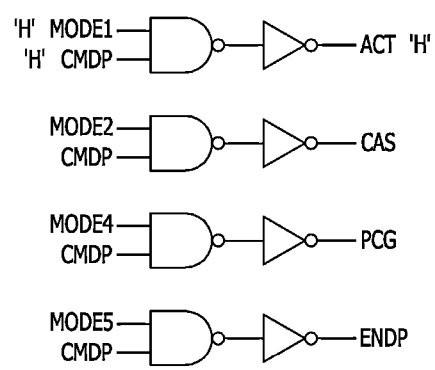

Referring to FIGS. 19 and 28, at the time point T2, the internal command generation circuit 191A may generate the active command ACT that is activated at a logic "high" level 'H' by the command pulse CMDP that is activated at a logic "high" level 'H' and the first mode signal MODE1 that is activated at a logic "high" level 'H'.

Figure 29:
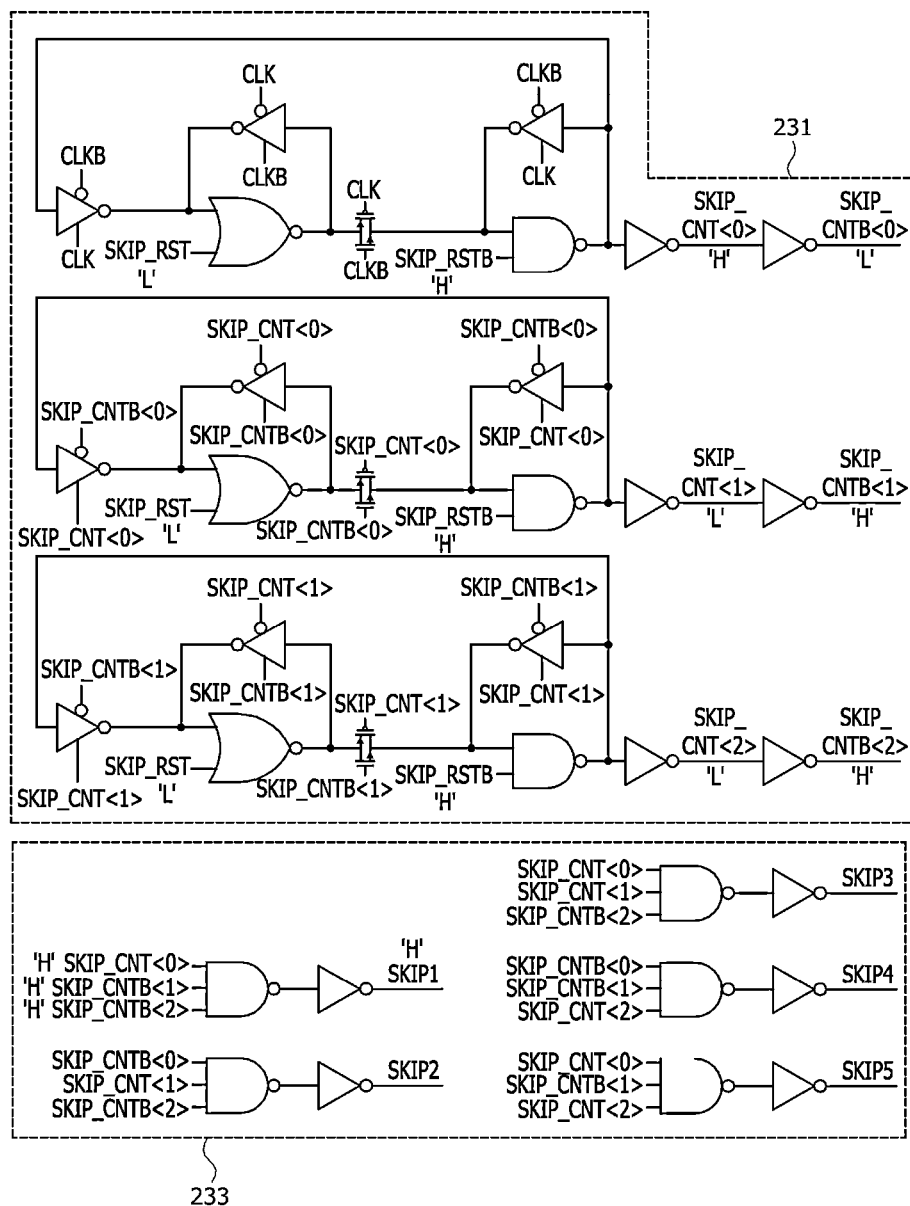

Referring to FIGS. 18 and 29, during the section T2~T3 in the first mode, the skip counter 231 may generate the first bit SKIP_CNT<0> of the skip count signal set to have a logic "high" level 'H' and the first bit SKIP_CNTB<0> of the inverted skip count signal set to have a logic "low" level 'L' in synchronization with a time point T11, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the second and third bits SKIP_CNT<1:2> of the skip count signal may maintain the initialized logic "low" level 'L', and the second and third bits SKIP_CNTB<1:2> of the inverted skip count signal may maintain the initialized logic "high"

level 'H'. Accordingly, the skip decoder 233 may generate the first skip signal SKIP1 that is activated at a logic "high" level 'H' by the first bit SKIP_CNT<0> of the skip count signal, and the second and third bits SKIP_CNTB<1:2> of the inverted skip count signal, all set to have a logic "high" level 'H'.

Figure 30:
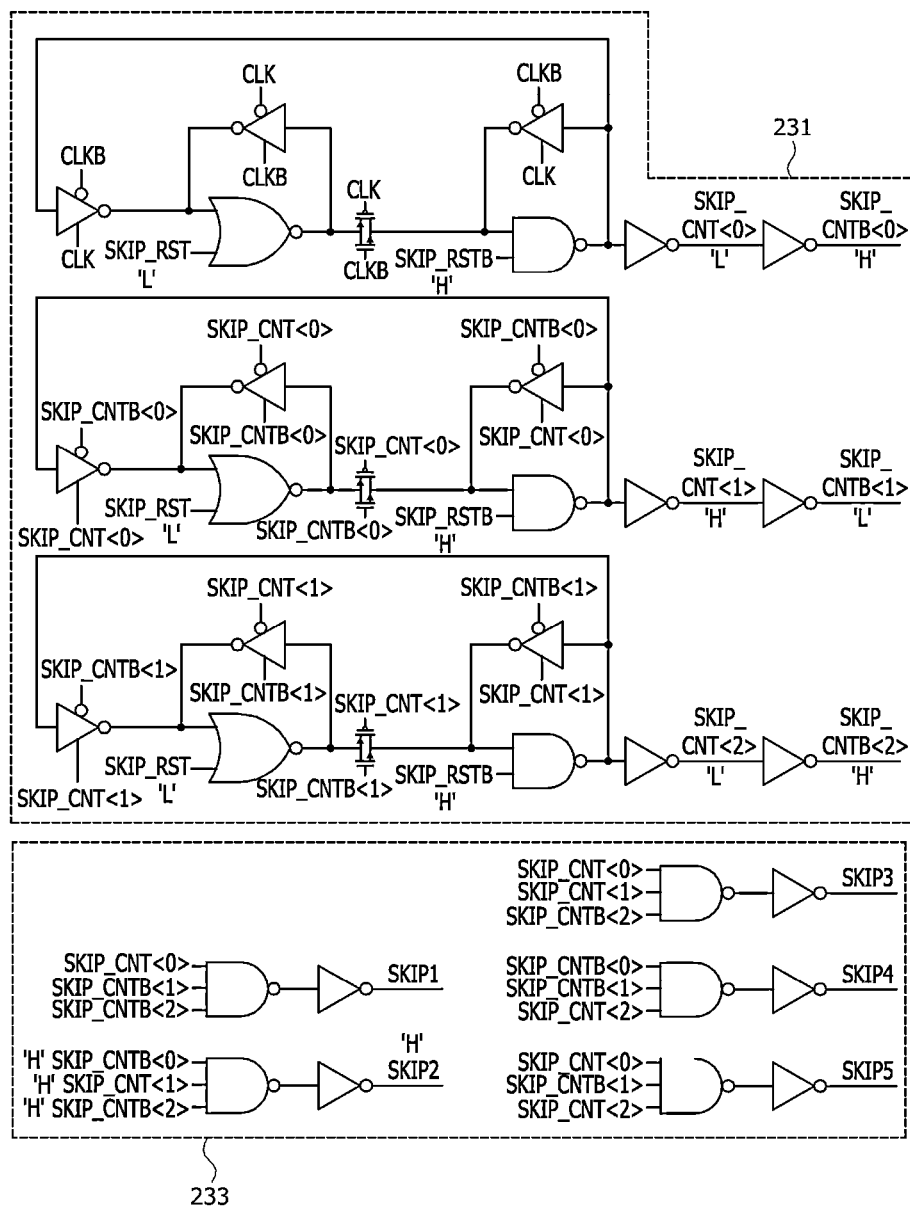

Referring to FIGS. 18 and 30, during the time period T2~T3 section in the first mode, the skip counter 231 may generate the first bit SKIP_CNT<0> of the skip count signal set to have a logic "low" level 'L', the second bit SKIP_CNT<1> of the skip count signal set to have a logic "high" level 'H', the first bit SKIP_CNTB<0> of the inverted skip count signal set to have a logic "high" level 'H', and the second bit SKIP_CNTB<1> of the inverted skip count signal set to have a logic "low" level 'L' in synchronization with a time point T12, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the third bit SKIP_CNT<2> of the skip count signal may maintain the initialized logic "low" level 'L', and the third bit SKIP_CNTB<2> of the inverted skip count signal may maintain the initialized logic "high" level 'H'. Accordingly, the skip decoder 233 may generate the second skip signal SKIP2 that is activated at a logic "high" level 'H' by the first bit SKIP_CNTB<0> of the inverted skip count signal SKIP_CNT<0:2>, the second bit SKIP_CNT<1> of the skip count signal SKIP_CNT<0:2>, and the third bit SKIP_CNTB<2> of the inverted skip count signal SKIP_CNT<0:2>, that are all set to have a logic "high" level 'H'.

Figure 20:
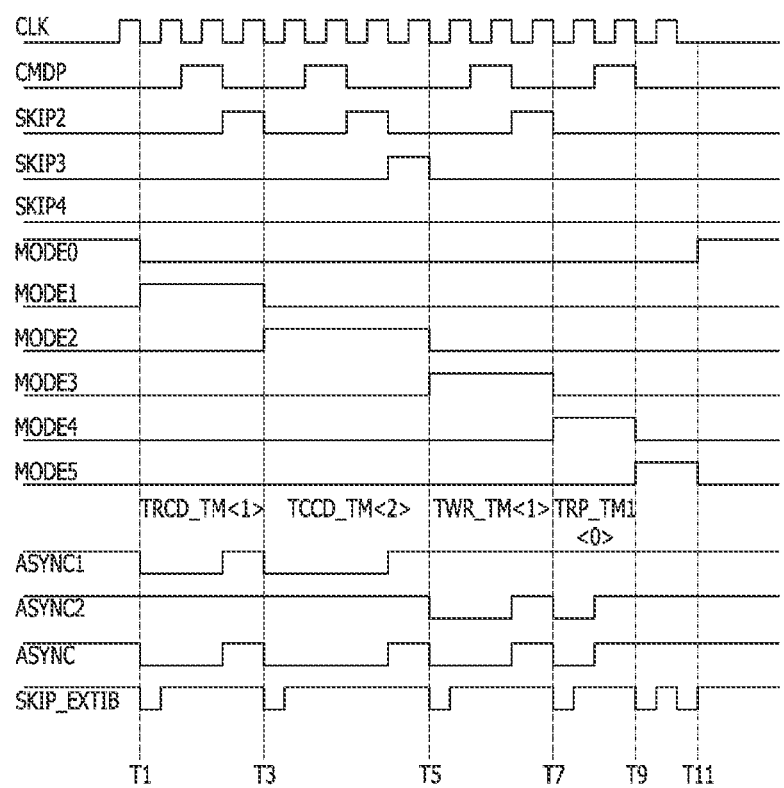
Figure 31:
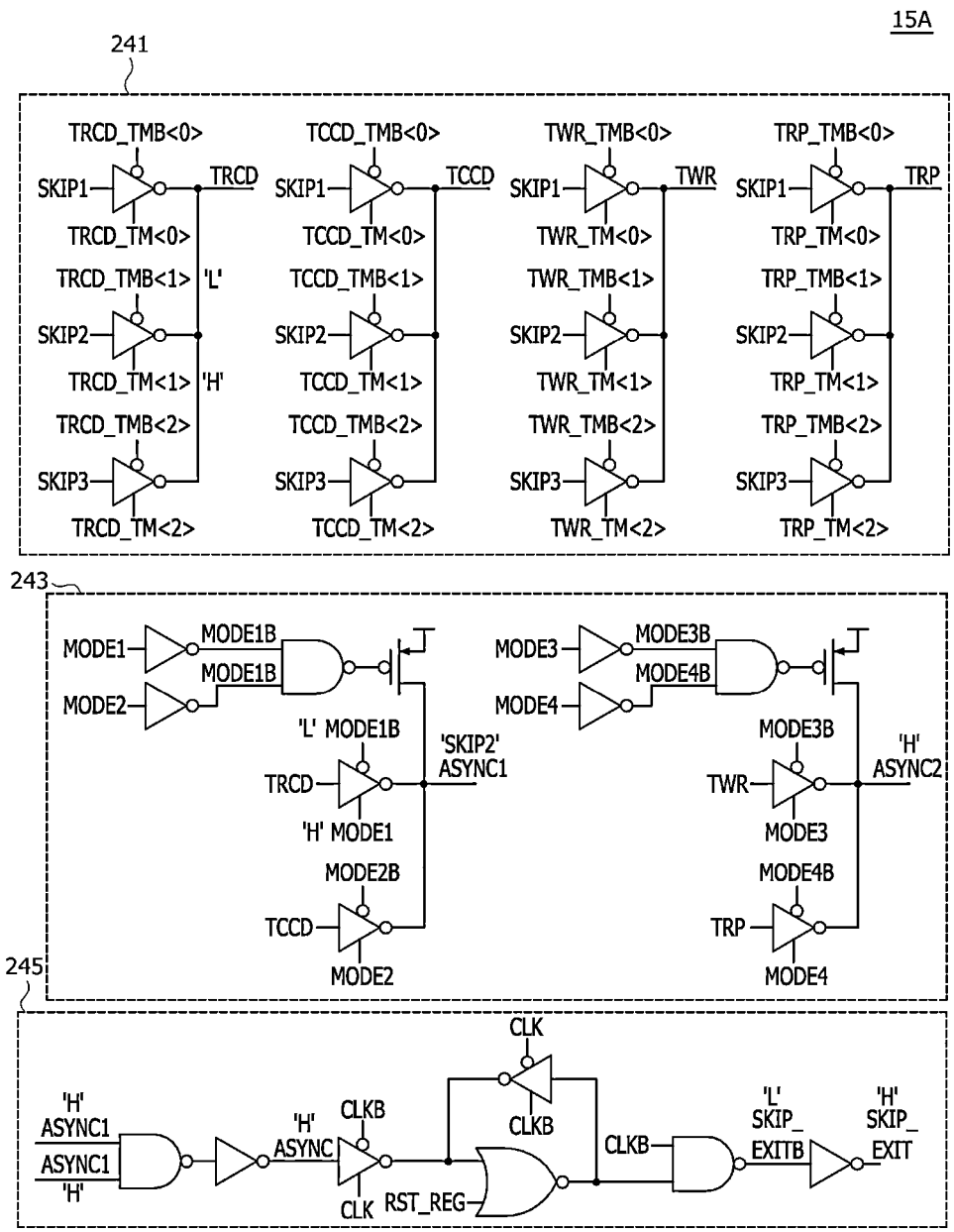

Referring to FIGS. 20 and 31, the test mode setting circuit 241 may inversely buffer the second skip signal SKIP2 to output the inversely buffered signal as the first skip setting signal TRCD in a state in which the second bit TRCD_TM<1> of the first test mode signal is set to have a logic "high" level 'H' and the second bit TRCD_TMB<1> of the first inverted test mode signal TRCD_TMB<0:2> is set to have a logic "low" level 'L'. In addition, the mode setting signal generation circuit 243 may output the first skip setting signal TRCD as the first mode setting signal ASYNC1 and generate the second mode setting signal ASYNC2 that maintains the logic "high" level 'H' by the first mode signal MODE1 that is activated at a logic "high" level 'H' and the first inverted mode signal MODE1B that is activated at a logic "low" level 'L' during the section T1-T3 in the first mode. The skip exit signal generation circuit 245 may generate the inverted skip exit signal SKIP_EXITB that is activated at a logic "low" level 'L' and the skip exit signal SKIP_EXIT that is activated at a logic "high" level 'H' in synchronization t the time point T3, the falling edge of the clock CLK in a state in which both the first mode setting signal ASYNC1 and the second mode setting signal ASYNC2 are activated at a logic "high" level 'H'.

Referring to FIGS. 17 and 10, the mode change pulse generation circuit 173A may generate the mode change pulse MODE_CHP that is activated at a logic "high" level 'H' and the inverted mode change pulse MODE_CHPB that is activated at a logic "low" level 'L' according to the fifth mode signal MODE5 that is deactivated at a logic "low" level 'L' and the mode reset signal MODE_RST that is deactivated at a logic "low" level 'L' at the time point T3, the falling edge of the inverted skip exit signal SKIP_EXITB.

Referring to FIGS. 17 and 11, at the time point T3, the mode counter 251 may set the first bit MODE_CNT<0> of the mode count signal MODE_CNT<0:2> to have a logic "low" level 'L', set the first bit MODE_CNTB<0> of the inverted mode count signal MODE_CNTB<0:2> to have a logic "high" level 'H', set the second bit MODE_CNT<1> of the mode count signal MODE_CNT<0:2> to have a logic "high" level 'H', and set the second bit MODE_CNTB<1> of the inverted mode count signal MODE_CNTB<0:2> to have a logic "low" level 'L' according to the mode change pulse MODE_CHP that is activated at a logic "high" level 'H' and the inverted mode change pulse MODE_CHPB that is activated at a logic "low" level 'L', in a state in which the mode reset signal MODE_RST is deactivated at a logic "low" level 'L' and the inverted mode reset signal MODE_RSTB is deactivated at a logic "high" level 'H'. In this case, the third bit MODE_CNT<2> of the mode count signal MODE_CNT<0:2> may maintain the initialized logic "low" level 'L', and the third bit MODE_CNTB<2> of the inverted mode count signal MODE_CNTB<0:2> may maintain the initialized logic "high" level 'H'. Accordingly, the mode decoder 253 may generate the second mode signal MODE2 that is activated at a logic "high" level 'H' by the first bit MODE_CNTB<0> of the inverted mode count signal MODE_CNTB<0:2>, the second bit MODE_CNT<1> of the mode count signal MODE_CNT<0:2>, and the third bit MODE_CNTB<2> of the inverted mode count signal MODE_CNTB<0:2>, all set to a logic "high" level 'H'. At the time point T3, because the second mode signal MODE2 is activated at a logic "high" level 'H', the semiconductor device 1 of FIG. 1 may enter the second mode.

Referring to FIGS. 18 and 6, at the time point T3, the skip initialization signal generation circuit 221 may generate the inverted skip reset signal SKIP_RSTB that is activated at a logic "low" level 'L' by the inverted skip reset signal SKIP_RSTB that is activated at a logic "low" level 'L'. Accordingly, the command pulse generation circuit 223 may generate the command pulse CMDP that is activated at a logic "high" level 'H' at a time point T4, the rising edge of the clock CLK, after the inverted skip reset signal SKIP_RSTB is activated at a logic "low" level 'L'.

Referring to FIGS. 19 and 13, at the time point T4, the internal command generation circuit 191A may generate the CAS command CAS that is activated at a logic "high" level 'H' by the command pulse CMDP that is activated at a logic "high" level 'H' and the second mode signal MODE2 that is activated at a logic "high" level 'H'.

Referring to FIGS. 18 and 7, during the section T3~T5 in the second mode, the skip counter 231 may generate the first bit SKIP_CNT<0> of the skip count signal SKIP_CNT<0:2> set to have a logic "high" level 'H' and the first bit SKIP_CNTB<0> of the inverted skip count signal SKIP_CNTB<0:2> set to have a logic "low" level 'L' in synchronization with the time point T41, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the second and third bits SKIP_CNT<1:2> of the skip count signal SKIP_CNT<0:2> may maintain the initialized logic "low" level 'L', and the second and third bits SKIP_CNTB<1:2> of the inverted skip count signal SKIP_CNTB<0:2> may maintain the initialized logic "high" level 'H'. Accordingly, the skip decoder 233 may generate the first skip signal SKIP1 that is activated at a logic "high" level 'H' by the first bit SKIP_CNT<0> of the skip count signal SKIP_CNT<0:2> and the second and third bits SKIP_CNTB<1:2> of the inverted skip count signal SKIP_CNTB<0:2>, all set to have a logic "high" level 'H'.

Referring to FIGS. 18 and 7, during sections T3~T5 section in the second mode, the skip counter 231 may generate the first bit SKIP_CNT<0> of the skip count signal SKIP_CNT<0:2> set to a logic "low" level 'L', the second bit SKIP_CNT<1> of the skip count signal SKIP_CNT<0:2> set to have a logic "high" level 'H', the first bit SKIP_CNTB<0> of the inverted skip count signal SKIP_CNTB<0:2> set to have a logic "high" level 'H', and the second bit SKIP_CNTB<1> of the inverted skip count signal SKIP_CNTB<0:2> set to have a logic "low" level 'L' in synchronization with a time point T42, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the third bit SKIP_CNT<2> of the skip count signal SKIP_CNT<0:2> may maintain the initialized logic "low" level 'L', and the third bit SKIP_CNTB<2> of the inverted skip count signal SKIP_CNTB<0:2> may maintain the initialized logic "high" level 'H'. Accordingly, the skip decoder 233 may generate the second skip signal SKIP2 that is activated at a logic "high" level 'H' by the first bit SKIP_CNTB<0> of the inverted skip count signal SKIP_CNTB<0:2>, the second bit SKIP_CNT<1> of the skip count signal SKIP_CNT<0:2>, and the third bit SKIP_CNTB<2> of the inverted skip count signal SKIP_CNTB<0:2>, all set to have a logic "high" level 'H'.

Referring to FIGS. 18 and 7, during the sections T3~T5 in the second mode, the skip counter 231 may generate the first bit SKIP_CNT<0> of the skip count signal SKIP_CNT<0:2> set to have a logic "high" level 'H', the second bit SKIP_CNT<1> of the skip count signal SKIP_CNT<0:2> set to have a logic "high" level 'H', the first bit SKIP_CNTB<0> of the inverted skip count signal SKIP_CNTB<0:2> set to have a logic "low" level 'L', and the second bit SKIP_CNTB<1> of the inverted skip count signal SKIP_CNTB<0:2> set to have a logic "low" level 'L' in synchronization with a time point T43, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the third bit SKIP_CNT<2> of the skip count signal SKIP_CNT<0:2> may maintain the initialized logic "low" level 'L', and the third bit SKIP_CNTB<2> of the inverted skip count SKIP_CNTB<0:2> signal may maintain the initialized logic "high" level 'H'. Accordingly, the skip decoder 233 may generate the third skip signal SKIP3 that is activated at a logic "high" level 'H' by the first bit SKIP_CNT<0> of the skip count signal SKIP_CNT<0:2>, the second bit SKIP_CNT<1> of the skip count signal SKIP_CNT<0:2>, and the third bit SKIP_CNTB<2> of the inverted skip count signal SKIP_CNTB<0:2>, all set to have a logic "high" level 'H'.

Referring to FIGS. 20 and 8, the test mode setting circuit 241 may inversely buffer the third skip signal SKIP3 to output the inversely buffered signal as the second skip setting signal TCCD in a state in which the third bit TCCD_TM<2> of the second test mode signal TCCD_TM<0:2> is set to have a logic "high" level 'H', and the third bit TCCD_TMB<2> of the second inverted test mode signal TCCD_TMB<0:2> is set to have a logic "low" level 'L'. In addition, during the sections T3-T5 section in the second mode, the mode setting signal generation circuit 243 may output the second skip setting signal TCCD as the first mode setting signal ASYNC1, and generate the second mode setting signal ASYNC2 that maintains the logic "high" level 'H' by the second mode signal MODE2 that is activated at a logic "high" level 'H' and the second inverted mode signal MODE2B that is activated at a logic "low" level 'L'. The skip exit signal generation circuit 245 may generate the inverted skip exit signal SKIP_EXITB that is activated at a logic "low" level 'L' and the skip exit signal SKIP_EXIT that is activated at a logic "high" level 'H' in synchronization with a time point T5, the falling edge of the clock CLK, in a state in which both the first mode setting signal ASYNC1 and the second mode setting signal ASYNC2 are activated at a logic "high" level 'H'.

Referring to FIGS. 17 and 10, the mode change pulse generation circuit 173A may generate the mode change pulse MODE_CHP that is activated at a logic "high" level 'H' and the inverted mode change pulse MODE_CHPB that is activated at a logic "low" level 'L' according to the fifth mode signal MODE5 deactivated at a logic "low" level 'L' and the mode reset signal MODE_RST deactivated at a logic "low" level 'L' at the time point T5, the falling edge of the inverted skip exit signal SKIP_EXITB.

Referring to FIGS. 17 and 11, at the time point T5, the mode counter 251 may set the first bit MODE_CNT<0> of the mode count signal MODE_CNT<0:2> to have a logic "high" level 'H', set the first bit MODE_CNTB<0> of the inverted mode count signal MODE_CNTB<0:2> to have a logic "low" level 'L', set the second bit MODE_CNT<1> of the mode count signal MODE_CNT<0:2> to have a logic "high" level 'H', set the second bit MODE_CNTB<1> of the inverted mode count signal MODE_CNTB<0:2> to have a logic "low" level 'L', set the third bit MODE_CNT<2> of the mode count signal MODE_CNT<0:2> to have a logic "low" level 'L', and set the third bit MODE_CNTB<2> of the inverted mode count signal MODE_CNTB<0:2> to have a logic "high" level 'H' according to the mode change pulse MODE_CHP that is activated at a logic "high" level 'H' and the inverted mode change pulse MODE_CHPB that is activated at a logic "low" level 'L' when the mode reset signal MODE_RST is deactivated at a logic "low" level 'L' and the inverted mode reset signal MODE_RSTB is deactivated at a logic "high" level 'H'. Accordingly, the mode decoder 253 may generate the third mode signal MODE3 that is activated at a logic "high" level 'H' by the first bit MODE_CNT<0> of the mode count signal MODE_CNT<0:2>, the second bit MODE_CNT<1> of the mode count signal MODE_CNT<0:2>, and the third bit MODE_CNTB<2> of the inverted mode count signal MODE_CNTB<0:2>. At the time point T5, because the third mode signal MODE3 is activated at a logic "high" level 'H', the semiconductor device (1 of FIG. 1) may enter the third mode.

Referring to FIGS. 18 and 6, at the time point T5, the skip initialization signal generation circuit 221 may generate the inverted skip reset signal SKIP_RSTB that is activated at a logic "low" level 'L' by the inverted skip reset signal SKIP_RSTB that is activated at a logic "low" level 'L'. Accordingly, the command pulse generation circuit 223 may generate the command pulse CMDP that is activated at a logic "high" level 'H' at a time point T6, the rising edge of the clock CLK, after the inverted skip reset signal SKIP_RSTB is activated at a logic "low" level 'L'.

Referring to FIGS. 18 and 7, during the section T5 to a section T7 in the third mode, the skip counter 231 may generate the first bit SKIP_CNT<0> of the skip count signal SKIP_CNT<0:2> set to have a logic "high" level 'H' and the first bit SKIP_CNTB<0> of the inverted skip count signal SKIP_CNTB<0:2> set to have a logic "low" level 'L' in synchronization with a time point T61, the falling edge of the clock CLK, in a state in which the skip reset signal SKIP_RST that is deactivated at a logic "low" level 'L', and the inverted skip reset signal SKIP_RSTB that is deactivated at a logic "high" level 'H, are received. In this case, the second and third bits SKIP_CNT<1:2> of the skip count signal SKIP_CNT<0:2> may maintain the initialized logic "low" level 'L', and the second and third bits of the inverted skip count signal SKIP_CNTB<1:2> may maintain the initialized logic "high" level 'H'. Accordingly, the skip decoder 233 may generate the first skip signal SKIP1 that is activated at a logic "high" level 'H' by the first bit SKIP_CNT<0> of the skip count signal SKIP_CNT<0:2>, and the second and third bits SKIP_CNTB<1:2> of the inverted skip count signal SKIP_CNTB<0:2>, all set to have a logic "high" level 'H'.

Referring to FIGS. 18 and 7, during the section T5-T7 in the third mode, the skip counter 231 may generate the first bit SKIP_CNT<0> of the skip count signal SKIP_CNT<0:2> set to have a logic "low" level 'L', the second bit SKIP_CNT<1> of the skip count signal SKIP_CNT<0:2> set to have a logic "high" level 'H', the first bit SKIP_CNTB<0> of the inverted skip count signal SKIP_CNTB<0:2> set to have a logic "high" level 'H', and the second bit SKIP_CNTB<1> of the inverted skip count signal SKIP_CNT<0:2> set to have a logic "low" level 'L' in synchronization with the time point T62, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the third bit SKIP_CNT<2> of the skip count signal may maintain the initialized logic "low" level 'L', and the third bit of the inverted skip count signal SKIP_CNTB<2> may maintain the initialized logic "high" level 'H'. Accordingly, the skip decoder 233 may generate the second skip signal SKIP2 that is activated at a logic "high" level 'H' by the first bit SKIP_CNTB<0> of the inverted skip count signal SKIP_CNTB<0:2>, the second bit SKIP_CNT<1> of the skip count signal SKIP_CNT<0:2>, and the third bit SKIP_CNTB<2> of the inverted skip count signal SKIP_CNTB<0:2>, all set to have a logic "high" level 'H'.

Referring to FIGS. 20 and 8, the test mode setting circuit 241 may inversely buffer the second skip signal SKIP2 to output the inversely buffered signal as the third skip setting signal TWR in a state in which the second bit TWR_TM<1> of the third test mode signal TWR_TM<0:2> is set to have a logic "high" level 'H' and the second bit TWR_TMB<1> of the third inverted test mode signal TWR_TMB<0:2> is set to have a logic "low" level 'L'. In addition, during the sections T5~T7 in the third mode, the mode setting signal generation circuit 243 may output the third skip setting signal TWR as the second mode setting signal ASYNC2 and generate the first mode setting signal ASYNC1 that maintains the logic "high" level 'H' by the third mode signal MODE3 that is activated at a logic "high" level 'H' and the third inverted mode signal MODE3B that is activated at a logic "low" level 'L'. The skip exit signal generation circuit 245 may generate the inverted skip exit signal SKIP_EXITB that is activated at a logic "low" level 'L' and the skip exit signal SKIP_EXIT that is activated at a logic "high" level 'H' in synchronization with the time point T7, the falling edge of the clock CLK, in a state in which both the first mode setting signal ASYNC1 and the second mode setting signal ASYNC2 are activated at a logic "high" level 'H'.

Referring to FIGS. 17 and 10, at the time point T7, the falling edge of the inverted skip exit signal SKIP_EXITB, the mode change pulse generation circuit 173A may generate the mode change pulse MODE_CHP that is activated at a logic "high" level 'H' and the inverted mode change pulse MODE_CHPB that is activated at a logic "low" level 'L' according to the fifth mode signal MODE5 that is deactivated at a logic "low" level 'L' and the mode reset signal MODE_RST that is deactivated at a logic "low" level 'L'.

Referring to FIGS. 17 and 11, at the time point T7, the mode counter 251 may set the first bit MODE_CNT<0> of the mode count signal to have a logic "low" level 'L', set the first bit MODE_CNTB<0> of the inverted mode count signal to have a logic "high" level 'H', set the second bit MODE_CNT<1> of the mode count signal MODE_CNT<0:2> to have a logic "low" level 'L', set the second bit MODE_CNTB<1> of the inverted mode count signal MODE_CNTB<0:2> to have a logic "high" level 'H', set the third bit MODE_CNT<2> of the mode count signal MODE_CNT<0:2> to have a logic "high" level 'H', set the third bit MODE_CNTB<2> of the inverted mode count signal MODE_CNTB<0:2> to have a logic "low" level 'L' according to the mode change pulse MODE_CHP that is activated at a logic "high" level 'H' and the inverted mode change pulse MODE_CHPB that is activated at a logic "low" level 'L' in a state in which the mode reset signal MDE_RST is deactivated at a logic "low" level 'L' and the inverted mode reset signal MODE_RSTB is deactivated at a logic "high" level. Accordingly, the mode decoder 253 may generate the fourth mode signal MODE4 that is activated at a logic "high" level 'H' by the first bit MODE_CNTB<0> of the inverted mode count signal MODE_CNTB<0:2>, the second bit MODE_CNTB<1> of the inverted mode count signal, and the third bit MODE_CNTB<2> of the mode count signal MODE_CNT<0:2>, all set to have a logic "high" level 'H'. At the time point T7, because the fourth mode signal MODE4 may be activated at a logic "high" level 'H', the semiconductor device (1 of FIG. 1) may enter the fourth mode.

Referring to FIGS. 18 and 6, at the time point T7, the skip initialization signal generation circuit 221 may generate the inverted skip reset signal SKIP_RSTB that is activated at a logic "low" level 'L' by the inverted skip reset signal SKIP_RSTB that is activated at a logic "low" level 'L'. Accordingly, the command pulse generation circuit 223 may generate the command pulse CMDP that is activated at a logic "high" level 'H' at a time point T8, the rising edge of the clock CLK, after the inverted skip reset signal SKIP_RSTB is activated at a logic "low" level 'L'.

Referring to FIGS. 19 and 13, at time point T8, the internal command generation circuit 191A may generate the precharge command PCG that is activated at a logic "high" level 'H' by the command pulse CMDP that is activated at a logic "high" level 'H' and the fourth mode signal MODE4 that is activated at a logic "high" level 'H'.

Referring to FIGS. 18 and 7, during the section T7 to T9 in the fourth mode, the skip counter 231 may generate the first bit SKIP_CNT<0> of the skip count signal SKIP_CNT<0:2> that is set to have a logic "high" level 'H' and the first bit SKIP_CNTB<0> of the inverted skip count signal SKIP_CNTB<0:2> set to have a logic "low" level 'L' in synchronization with a start point of time point T81, the falling edge of the clock CLK, in a state in which the skip reset signal SKIP_RST that is deactivated at a logic "low" level 'L' and the inverted skip reset signal SKIP_RSTB that is deactivated at a logic "high" level 'H' are received. In this case, the second and third bits SKIP_CNT<1:2> of the skip count signal may maintain the initialized logic "low" level 'L', and the second and third bits SKIP_CNTB<1:2> of the inverted skip count signal SKIP_CNTB<0:2> may maintain the initialized logic "high" level 'H'. Accordingly, the skip decoder 233 may generate the first skip signal SKIP1 that is activated at a logic "high" level 'H' by the first bit SKIP_CNT<0> of the skip count signal SKIP_CNT<0:2> and the second and third bits SKIP_CNTB<1:2> of the inverted skip count signal SKIP_CNTB<0:2>, all set to have a logic "high" level 'H'.

Referring to FIGS. 20 and 8, the test mode setting circuit 241 may inversely buffer the first skip signal SKIP1 to output the inversely buffered signal as the fourth skip setting signal TRP in a state in which the first bit TRP_TM<0> of the fourth test mode signal TRP_TM<0:2> is set to have a logic "high" level 'H' and the first bit TRP_TMB<0> of the fourth inverted test mode signal is set to have a logic "low" level 'L'. In addition, during the section T7~T9 in the fourth mode, the mode setting signal generation circuit 243 may output the fourth skip setting signal TRP as the second mode setting signal ASYNC2 and generate the first mode setting signal ASYNC1 that maintains the logic "high" level 'H' by the fourth mode signal MODE4 that is activated at a logic "high" level 'H' and the fourth inverted mode signal MODE4B that is activated at a logic "low" level 'L'. The skip exit signal generation circuit 245 may generate the inverted skip exit signal SKIP_EXITB that is activated at a logic "low" level 'L' and the skip exit signal SKIP_EXIT that is activated at a logic "high" level 'H' in synchronization with a time point T9, the falling edge of the clock CLK, in a state in which both the first mode setting signal ASYNC1 and the second mode setting signal ASYNC2 are activated at a logic "high" level 'H'.

Referring to FIGS. 17 and 10, at the time point T9, the falling edge of the inverted skip exit signal SKIP_EXITB, the mode change pulse generation circuit 173A may generate the mode change pulse MODE_CHP that is activated at a logic "high" level 'H' and the inverted mode change pulse MODE_CHPB that is activated at a logic "low" level 'L' according to the fifth mode signal MODE5 that is deactivated at a logic "low" level 'L' and the mode reset signal MODE_RST that is deactivated at a logic "low" level 'L'.

Figure 32:
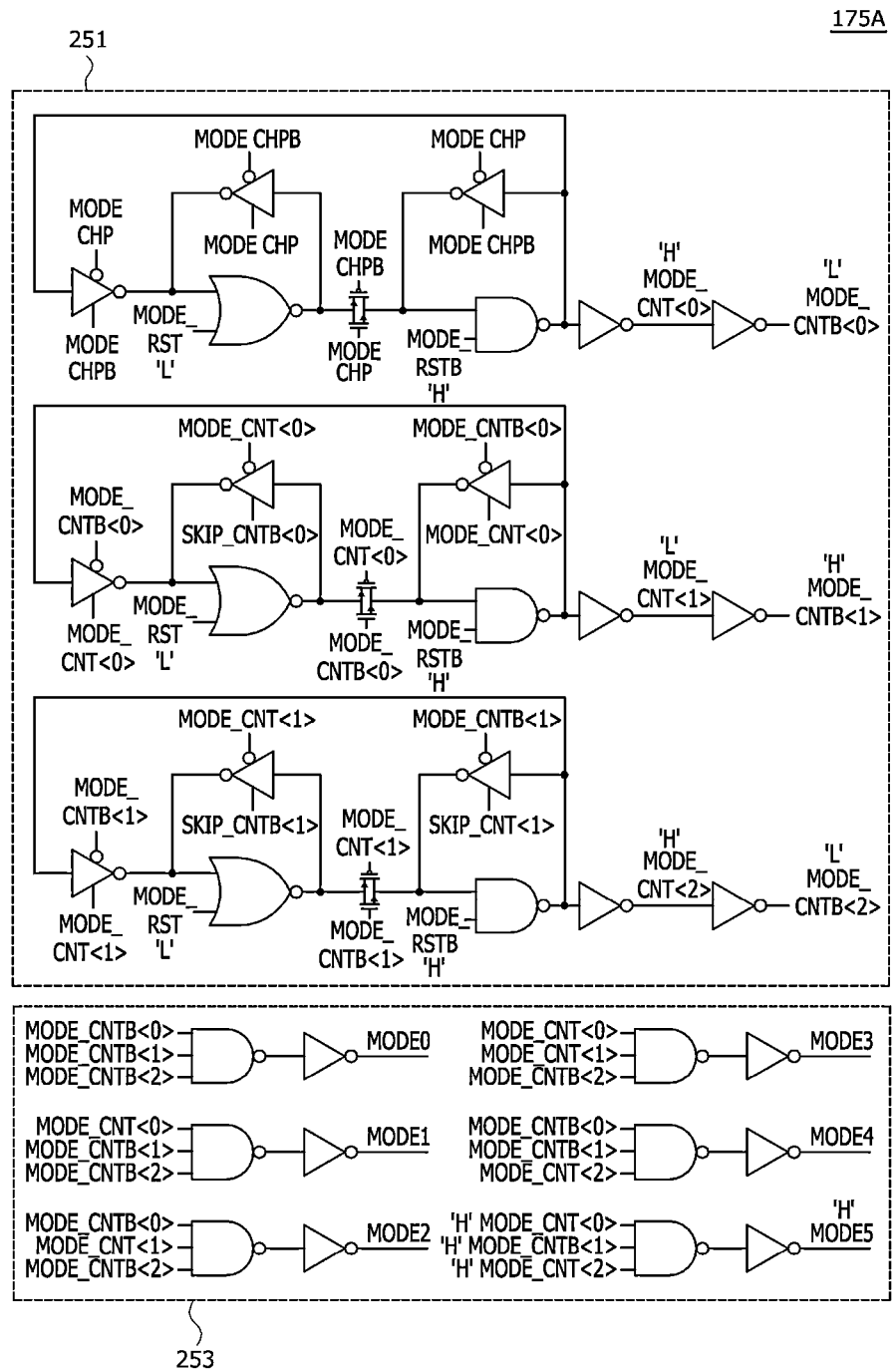

Referring to FIGS. 17 and 32, at the time point T9, the mode counter 251 may set the first bit MODE_CNT<0> of the mode count signal MODE_CNT<0:2> to have a logic "high" level 'H', set the first bit MODE_CNTB<0> of the inverted mode count signal MODE_CNT<0:2> to have a logic "low" level 'L', set the second bit MODE_CNT<1> of the mode count signal MODE_CNT<0:2> to have a logic "low" level 'L', set the second bit MODE_CNTB<1> of the inverted mode count signal MODE_CNTB<0:2> to have a logic "high" level 'H', set the third bit MODE_CNT<2> of the mode count signal MODE_CNT<0:2> to have a logic "high" level 'H', and set the third bit MODE_CNTB<2> of the inverted mode count signal MODE_CNTB<0:2> to have a logic "low" level 'L' according to the mode change pulse MODE_CHP that is activated at a logic "high" level 'H' and the inverted mode change pulse MODE_CHPB that is activated at a logic "low" level 'L' in a state in which the mode reset signal MODE_RST is deactivated at a logic "low" level and the inverted mode reset signal MODE_RSTB is deactivated at a logic "high" level. Accordingly, the mode decoder 253 may generate the fifth mode signal MODE5 that is activated at a logic "high" level 'H' by the first bit MODE_CNT<0> of the mode count signal MODE_CNT<0:2>, the second bit MODE_CNTB<1> of the inverted mode count signal MODE_CNTB<0:2>, and the third bit MODE_CNT<2> of the mode count signal MODE_CNT<0:2>, all set to have a logic "high" level 'H'. At the start of T9, because the fifth mode signal MODE5 is activated at a logic "high" level 'H', the semiconductor device 1 of FIG. 1 may enter the fifth mode.

Referring to FIGS. 18 and 6, at the start of time point T9, the skip initialization signal generation circuit 221 may generate the inverted skip reset signal SKIP_RSTB that is activated at a logic "low" level 'L' by the inverted skip reset signal SKIP_RSTB that is activated at a logic "low" level 'L'. Accordingly, the command pulse generation circuit 223 may generate the command pulse CMDP that is activated at a logic "high" level 'H' at the start of T10, the rising edge of the clock CLK, after the inverted skip reset signal SKIP_RSTB is activated at a logic "low" level 'L'.

Referring to FIGS. 19 and 13, at the start of T10, the internal command generation circuit 191A may generate the end pulse ENDP that is activated at a logic "high" level 'H' by the command pulse CMDP that is activated at a logic "high" level 'H' and the fifth mode signal MODE5 that is activated at a logic "high" level 'H'. At time point T11 when the preset end delay section has elapsed from the time point T10, the internal command generation circuit 191A may generate the end command BIST_CTRL that is activated at a logic "high" level 'H'.

Figure 33:
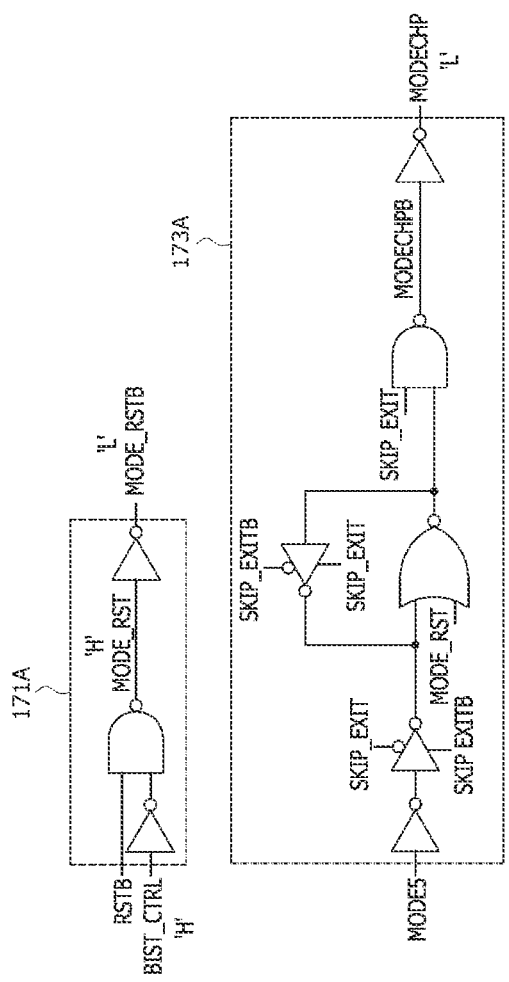

Referring to FIGS. 20 and 33, when the end command BIST_CTRL is activated at a logic "high" level 'H' at the time point T11, the mode reset signal generation circuit 171A may generate the mode reset signal MODE_RST that is activated at a logic "high" level 'H' and the inverted mode reset signal MODE_RSTB that is activated at a logic "low" level 'L'.

Referring to FIGS. 20 and 11, when the mode reset signal MODE_RST is activated at a logic "high" level 'H' and the inverted mode reset signal MODE_RSTB is activated at a logic "low" level 'L', the mode signal generation circuit 175A may generate the mode count signal MODE_CNT<0:2> that is initialized at a logic "low" level 'L' and the inverted mode reset signal MODE_RSTB that is initialized at a logic "high" level 'H', and generate the initial mode signal MODE0 that is activated at a logic "high" level 'H' to enter the initial mode.

Figure 21:
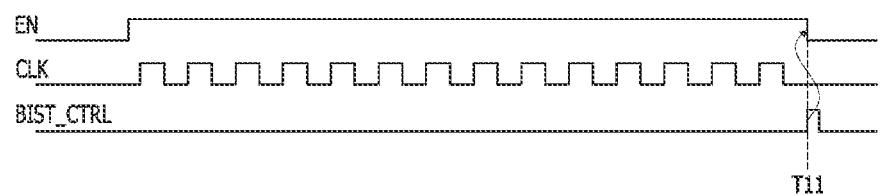

Referring to FIG. 21, when the end command BIST_CTRL is activated at a logic "high" level 'H' at the time point T11, because the clock section signal EN is deactivated at a logic "low" level, the toggling of the clock CLK may be stopped.

The semiconductor device 1 configured as described above may control the timing at which the internal commands are generated, responsive to the skip signals SKIP1, SKIP2, SKIP3, SKIP4 and SKIP5 and the selection skip signal according to the test mode signals TRCD_TM<0:2>, TCCD_TM<0:2>, TWR_TM<0:2>, and TRP_TM<0:2>. Accordingly, the semiconductor device 1 can easily control the timing at which the internal commands are generated in a state where no external command is applied. In addition, the semiconductor device 1 may set one of the SKIP1, SKIP2, SKIP3, SKIP4, and SKIP5 as the selection skip signal according to the test mode signals TRCD_TM<0:2>, TCCD_TM<0:2>, TWR_TM<0:2>, and TRP_TM<0:2> for each mode, and control the timing at which each of the plurality of internal commands is generated, responsive to the selection skip signal for each mode. Accordingly, the semiconductor device 1 can easily control the timing at which each of the plurality of internal commands is generated in a state where no external command is applied.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor device comprising:
a skip exit control circuit configured to:
select one of a plurality of skip signals as a selection skip signal, responsive to a test mode signal, and configured to generate a skip exit signal, responsive to the selection skip signal;
a mode control circuit configured to generate a mode signal to change modes responsive to the skip exit signal until entering a preset final mode; and
a command control circuit configured to generate internal commands for each mode, responsive to the mode signal.

2. The semiconductor device of claim 1, wherein the skip exit control circuit is configured to generate the skip exit signal in synchronization with a clock after the selection skip signal is activated for a mode.

3. The semiconductor device of claim 2, further comprising a clock control circuit configured to generate the clock, responsive to a start pulse, which starts a test mode.

4. The semiconductor device of claim 1,
wherein the mode comprises a first mode and a second mode,
wherein the test mode signal comprises a first test mode signal and a second test mode signal,
wherein the selection skip signal includes comprises a first selection skip signal and a second selection skip signal, and
wherein the skip exit control circuit is configured to:
generate the skip exit signal in substantial synchronization with the clock after the first selection skip signal selected responsive to the first test mode signal is activated in the first mode, and
generate the skip exit signal in synchronization with the clock after the second selection skip signal selected responsive to the second test mode signal is activated in the second mode.

5. The semiconductor device of claim 1, wherein the skip exit control circuit includes:
a test mode setting circuit configured to set a skip setting signal, responsive to the selection skip signal;
a mode setting signal generation circuit configured to generate a mode setting signal from the skip setting signal, responsive to the mode signal; and
a skip exit signal generation circuit configured to generate the skip exit signal in synchronization with the mode setting signal and the clock.

6. The semiconductor device of claim 5, wherein the test mode setting circuit is configured to inversely buffer the selection skip signal to generate the skip setting signal.

7. The semiconductor device of claim 6, wherein the mode setting signal generation circuit is configured to inversely buffer the skip setting signal to generate the mode setting signal.

8. The semiconductor device of claim 5, wherein the skip exit signal generation circuit is configured to generate the skip exit signal in synchronization with the clock after the mode setting signal is activated.

9. The semiconductor device of claim 1,
wherein the mode comprises an initial mode, a first mode, and a second mode,
wherein the mode signal comprises a first mode signal and a second mode signal, and
wherein the mode control circuit is configured to generate the first mode signal to enter the first mode when the skip exit signal is activated in the initial mode.

10. The semiconductor device of claim 9, wherein the mode control circuit is configured to generate the second mode signal to enter the second mode when the skip exit signal is activated in the first mode.

11. The semiconductor device of claim 1, wherein the mode control circuit is configured to generate the mode signal to enter the initial mode when an end command is generated for terminating a test mode in the preset final mode.

12. The semiconductor device of claim 1, wherein the mode control circuit includes:
a mode reset signal generation circuit configured to generate a mode reset signal, responsive to a reset signal and an end command;
a mode change pulse generation circuit configured to generate a mode change pulse, responsive to the mode reset signal and the skip exit signal; and
a mode signal generation circuit configured to generate the mode signal, responsive to the mode reset signal and the mode change pulse.

13. The semiconductor device of claim 1,
wherein the mode signal comprises a first mode signal and a second mode signal,
wherein the internal commands comprise a first internal command and a second internal command, and
wherein the command control circuit is configured to:
generate the first internal command, responsive to the first mode signal and a command pulse, and
generate the second internal command, responsive to the second mode signal and the command pulse.

14. The semiconductor device of claim 1,
wherein the internal commands comprise: an active command, a CAS command, a precharge command, and an end command, and
wherein the command control circuit is configured to sequentially generate: the active command, the CAS command, the precharge command, and the end command, for each mode that changes responsive to the skip exit signal.

15. The semiconductor device of claim 1, wherein the command control circuit includes:
an internal command generation circuit configured to generate the internal commands and an end pulse, responsive to the mode signal and a command pulse; and
an end command generation circuit configured to generate an end command, responsive to the end pulse.

16. The semiconductor device of claim 15, wherein the end command generation circuit is configured to generate the end command at a time point when a preset end delay section elapses from a time point when the end pulse is activated.

17. The semiconductor device of claim 1, further comprising a skip control circuit configured to generate: at least one of a command pulse and the skip signal, responsive to the skip exit signal.

18. The semiconductor device of claim 17, wherein the skip control circuit is configured to generate the command pulse activated in synchronization with a clock after the skip exit signal is activated.

19. The semiconductor device of claim 17, wherein the skip control circuit is configured to:
count a clock;
generate a skip counting signal;
decode the skip counting signal; and
generate the skip signal after the skip exit signal is activated.

20. A semiconductor device comprising:
a skip control circuit configured to generate a command pulse and generate a plurality of skip signals, responsive to a skip exit signal;
a mode control circuit configured to generate a mode signal, which changes a mode, responsive to the skip exit signal until entering a preset final mode; and
a command control circuit configured to generate internal commands for each mode, responsive to the command pulse and the mode signal,
wherein the skip exit signal is generated responsive to a selection skip signal, and
wherein the selection skip signal is selected from one of the plurality of skip signals, responsive to a test mode signal.

21. The semiconductor device of claim 20, wherein the skip control circuit is configured to generate the command pulse activated in synchronization with a clock after the skip exit signal is activated.

22. The semiconductor device of claim 21, further comprising a clock control circuit configured to generate the clock, responsive to a start pulse to start the test mode.

23. The semiconductor device of claim 20, wherein the skip control circuit is configured to:
count a clock to generate a skip counting signal; and
decode the skip counting signal to generate the skip signals, after the skip exit signal is activated.

24. The semiconductor device of claim 20,
wherein the mode comprises an initial mode, a first mode, and a second mode,
wherein the mode signal comprises a first mode signal and a second mode signal, and
wherein the mode control circuit is configured to generate the first mode signal to enter the first mode when the skip exit signal is activated in the initial mode.

25. The semiconductor device of claim 24, wherein the mode control circuit is configured to generate the second mode signal to enter the second mode when the skip exit signal is activated in the first mode.

26. The semiconductor device of claim 20, wherein the mode control circuit is configured to generate the mode signal to enter the initial mode when an end command is generated for terminating a test mode in the final mode.

27. The semiconductor device of claim 20, wherein the mode control circuit includes:
a mode reset signal generation circuit configured to generate a mode reset signal, responsive to a reset signal and an end command;
a mode change pulse generation circuit configured to generate a mode change pulse, responsive to the mode reset signal and the skip exit signal; and
a mode signal generation circuit configured to generate the mode signal, responsive to the mode reset signal and the mode change pulse.

28. The semiconductor device of claim 20, further comprising a skip exit control circuit configured to generate the skip exit signal in synchronization with a clock, after the selection skip signal is activated for each mode.

29. The semiconductor device of claim 28, wherein the skip exit control circuit includes:
a test mode setting circuit configured to generate a skip setting signal, responsive to the selection skip signal;
a mode setting signal generation circuit configured to generate a mode setting signal from the skip setting signal, responsive to the mode signal; and
a skip exit signal generation circuit configured to generate the skip exit signal in synchronization with the mode setting signal and the clock.

30. A semiconductor device comprising:
a skip exit control circuit configured to select one of a plurality of skip signals as a first selection skip signal, responsive to a first test mode signal in a first mode, and configured to generate a skip exit signal that is activated to enter a second mode from the first selection skip signal in synchronization with a clock;
a mode control circuit configured to generate the first mode signal to enter the first mode when the skip exit signal is activated in an initial mode, and generate the second mode signal to enter the second mode when the skip exit signal is activated in the first mode; and
a command control circuit configured to generate a first internal command in the first mode, responsive to the first mode signal, and configured to generate a second internal command in the second mode, responsive to the second mode signal.

31. The semiconductor device of claim 30, further comprising a clock control circuit configured to generate the clock, responsive to a start pulse to start a test mode.

32. The semiconductor device of claim 31, wherein the mode control circuit is configured to generate an initial mode signal to enter the initial mode, responsive to the start pulse.

33. The semiconductor device of claim 31, wherein the mode control circuit is configured to initialize the first mode signal and the second mode signal to enter the initial mode when an end command for terminating the test mode is generated in a final mode.

34. A method of generating internal commands of a semiconductor device, comprising:
generating a skip exit signal responsive to a selected skip signal, the selected skip signal being generated by a test mode signal;
changing operation modes of the semiconductor device responsive to a mode signal, the mode signal being generated by the selected skip signal; and
controlling a generation timing of each of the internal commands responsive to the mode signal without input of an external command.

* * * * *